US012782845B2

(12) United States Patent
Munetsugu et al.

(10) Patent No.: US 12,782,845 B2
(45) Date of Patent: Nov. 3, 2026

(54) TONER CONTAINER WITH REMOVABLE FILM

(71) Applicant: CANON KABUSHIKI KAISHA, Tokyo (JP)

(72) Inventors: Hiroyuki Munetsugu, Kanagawa (JP); Mitsuhiro Sato, Tokyo (JP); Goshi Ozaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/757,121

(22) Filed: Jun. 27, 2024

(65) Prior Publication Data

US 2025/0004398 A1 Jan. 2, 2025

(30) Foreign Application Priority Data

Jun. 30, 2023 (JP) ................................ 2023-107826

(51) Int. Cl.
*G03G 15/08* (2006.01)

(52) U.S. Cl.
CPC ..... *G03G 15/0884* (2013.01); *G03G 15/0874* (2013.01)

(58) Field of Classification Search
CPC ........... G03G 15/0886; G03G 15/0874; G03G 15/0865; G03G 15/0877; B65D 23/0878; B65D 55/0854; B65D 81/3461; B65D 75/5883; B65D 41/62
See application file for complete search history.

(56) References Cited

U.S. PATENT DOCUMENTS

2010/0209141 A1* 8/2010 Ikado ................ G03G 21/1676 399/119
2014/0363210 A1* 12/2014 Nishida ............. G03G 15/0874 399/258
2021/0247706 A1* 8/2021 Mitsumata ......... G03G 21/1633
2021/0276763 A1* 9/2021 Oh ..................... B65D 23/0878
2021/0318642 A1* 10/2021 Koguchi ............ G03G 15/0886
2021/0318645 A1* 10/2021 Oba ................... G03G 15/0894

FOREIGN PATENT DOCUMENTS

JP 2001005273 A 1/2001
JP 2011034014 A 2/2011
JP 2011112884 A 6/2011
JP 2019184877 A 10/2019
JP 2021026199 A 2/2021
JP 2023049033 A 4/2023

* cited by examiner

*Primary Examiner* — Jessica L Eley
(74) *Attorney, Agent, or Firm* — Canon U.S.A., Inc. IP Division

(57) ABSTRACT

A toner container that is removable from an image forming apparatus includes a storage portion including a container portion that stores toner and a front end portion including a discharge port that discharges the toner from the toner container and a nozzle including a passage that enables the toner to pass through the passage toward the discharge port. At least part of the front end portion is covered by a film that is removable.

15 Claims, 26 Drawing Sheets

TONER CONTAINER WITH REMOVABLE FILM

BACKGROUND

Field

The present disclosure generally relates to a toner container mountable to an image forming apparatus that forms an image on a recording medium.

Description of the Related Art

In general, an electrophotographic image forming apparatus forms an image by transferring a toner image formed on a surface of a photoconductive drum to a transfer material serving as a transfer medium. To supply toner to the image forming apparatus, a method using a process cartridge or a method for replenishing toner itself is employed, for example. The method using the process cartridge is a method in which a photoconductive drum and a developer container are integrated into a process cartridge and, when the toner runs out, the process cartridge is replaced with a new one.

In contrast, the method for replenishing the toner itself is a method in which when the toner runs out, toner is supplied into a developer container. For example, Japanese Patent Laid-Open No. 2021-26199 describes an image forming apparatus that enables toner to be supplied into the developer container using a toner pack mountable to a mounting unit provided in the developer container.

SUMMARY

According to some embodiments, a toner container may include a storage portion including a pouch configured to store toner, a front end portion including a discharge port configured to discharge the toner stored in the storage portion to an outside of the toner container and a nozzle including a passage configured to enable the toner to pass through the passage toward the discharge port, and a film configured to be in contact with the front end portion and cover at least part of the front end portion.

Further features of the present disclosure will become apparent from the following description of exemplary embodiments with reference to the attached drawings.

DESCRIPTION OF THE EMBODIMENTS

Various exemplary embodiments, features, and aspects of the present disclosure are described below with reference to the accompanying drawings.

First Embodiment

Figure 1A:
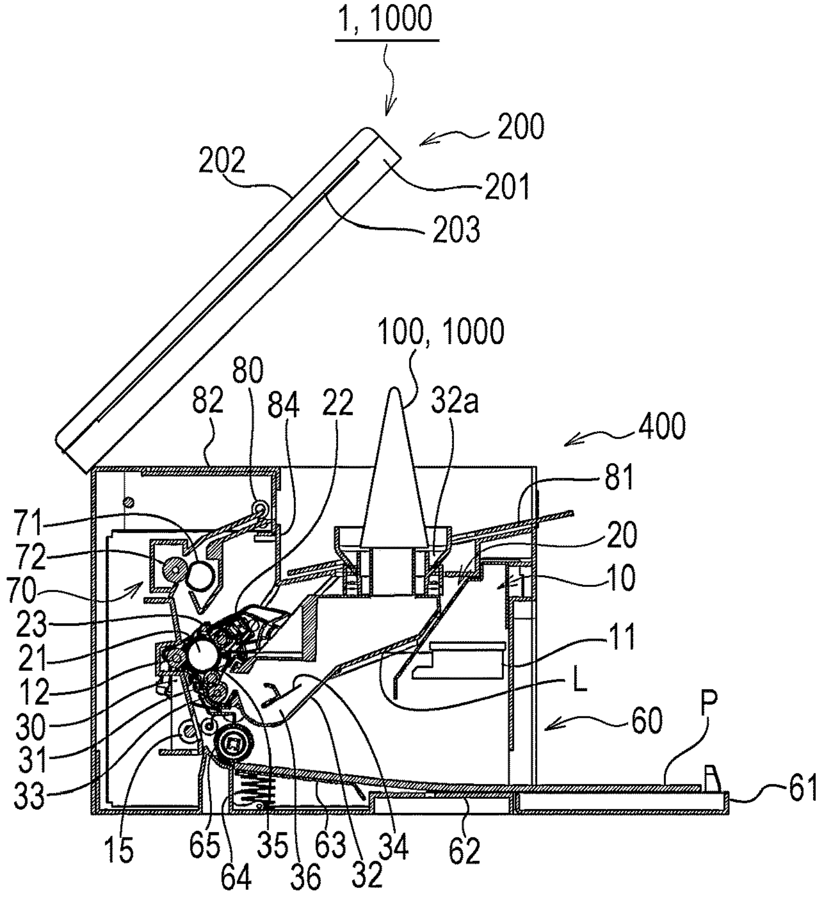
FIG. 1A is a schematic illustration of an image forming apparatus according to a first embodiment.

FIG. 1A is a schematic illustration of the configuration of an image forming apparatus 1 according to the first embodiment. The image forming apparatus 1 is a monochrome printer that forms an image on a recording medium P on the basis of image information input from an external device. Examples of the recording medium P include a variety of sheets of different materials, such as plain paper and thick paper, a plastic film, such as an overhead projector sheet, a specially shaped sheet, such as an envelope and index paper, and cloth.

Architecture

Figure 1B:
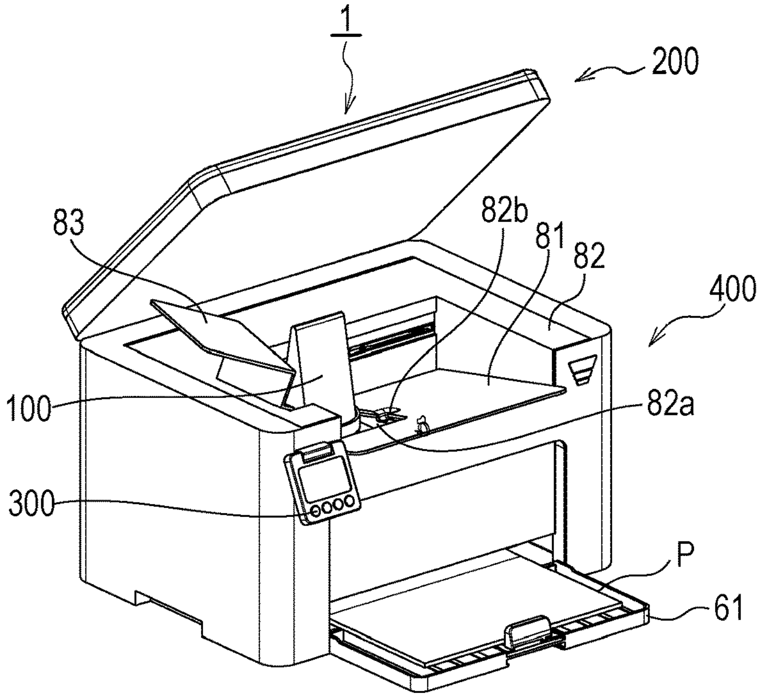
FIG. 1B is a perspective view of the image forming apparatus.

As illustrated in FIGS. 1A and 1B, the image forming apparatus 1 includes a printer body 400 (the main body of the apparatus), a reader device 200 that is openably supported by the printer body 400, and an operation unit 300 mounted to the exterior surface of the printer body 400. The printer body 400 includes an image forming unit 10 that forms a toner image on a recording medium, a feed unit 60 that feeds a recording medium to the image forming unit 10, a fixing unit 70 that fixes the toner image formed by the image forming unit 10 onto the recording medium, and a discharge roller pair 80.

A photoconductive drum 21 is a photosensitive member formed into a cylindrical shape. According to the present embodiment, the photoconductive drum 21 has a photosensitive layer formed by a negatively charged organic photosensitive member on a drum-shaped base formed of aluminum. The photoconductive drum 21 serving as an image bearing member is driven by a motor to rotate in a predetermined direction (a clockwise direction in FIG. 1A) at a predetermined process speed.

A charging roller 22 is in contact with the photoconductive drum 21 with a predetermined pressure contact force to form a charging unit. The charging roller 22 is applied with a desired charging voltage by a charging high-voltage power supply and uniformly charges a surface of the photoconductive drum 21 to a predetermined potential. According to the present embodiment, the photoconductive drum 21 is charged to negative polarity by the charging roller 22. A pre-exposure unit 23 removes the surface potential of the photoconductive drum 21 at a position before the position of the charging unit in order to generate stable electric discharge in the charging unit.

The scanner unit 11 serving as an exposure unit scans and exposes the surface of the photoconductive drum 21 by using a polygon mirror and emitting, onto the photoconductive drum 21, a laser beam corresponding to image information input from an external device or the reader device 200. The exposure forms an electrostatic latent image on the surface of the photoconductive drum 21 in accordance with the image information. The scanner unit 11 is not limited to a laser scanner device. For example, an LED exposure device may be employed that includes an LED array including a plurality of LEDs arranged in the longitudinal direction of the photoconductive drum 21.

A developing device 30 includes a developing roller 31 serving as a toner bearing member that bears toner, a developer container 32 that serves as the frame of the developing device 30, and a supply roller 33 that can supply toner to the developing roller 31. The developing roller 31 and the supply roller 33 are rotatably supported by the developer container 32. The developing roller 31 is disposed in an opening portion of the developer container 32 so as to face the photoconductive drum 21. The supply roller 33 is in rotatable contact with the developing roller 31, and the toner contained in the developer container 32 is applied to the surface of the developing roller 31 by the supply roller 33. The supply roller 33 is not essential if a configuration capable of supplying sufficient toner to the developing roller 31 is employed.

The developing device 30 according to the present embodiment uses a contact development method as the development method. That is, the toner layer born on the developing roller 31 is brought into contact with the photoconductive drum 21 in a developing portion (a developing region) where the photoconductive drum 21 and the developing roller 31 face each other. A developing voltage is applied to the developing roller 31 by a developing high-voltage power supply. Under the developing voltage, the toner born on the developing roller 31 is transferred from the developing roller 31 to the drum surface in accordance with the potential distribution on the drum surface of the photoconductive drum 21 and, thus, an electrostatic latent image is developed into a toner image. According to the present embodiment, the reversal developing method is used. That is, the surface area of the photoconductive drum 21 is charged in a charging process and, thereafter, is exposed to attenuate the charge amount in an exposure process. Toner is deposited to the surface area where the charge amount is attenuated. Thus, a toner image is formed.

According to the present embodiment, toner with a particle diameter of 6 μm and a negative normal charge polarity is used. The toner according to the present embodiment is polymerized toner produced by a polymerization method, for example. In addition, the toner according to the present embodiment does not contain a magnetic component and is a so-called non-magnetic one-component toner which is born onto the developing roller 31 mainly by an intermolecular force and an electrostatic force (an image force). However, one-component toner containing a magnetic component may be used. In addition to toner particles, the one-component toner may contain additives (for example, wax or silica fine particles) to control the flowability and the charging performance of the toner. Alternatively, two-component toner composed of non-magnetic toner and magnetic carriers may also be used as the toner. When toner having magnetism is used, a cylindrical developing sleeve with a magnet disposed inside is used as the toner bearing member, for example.

An agitator member 34 is provided inside the developer container 32. The agitator member 34 is driven by a motor M1 (refer to FIG. 25) and rotates to agitate the toner in the developer container 32 and feed the toner toward the developing roller 31 and the supply roller 33. In addition, the agitator member 34 has the role of circulating, in the developer container, the toner that is not used for development and that is stripped off from the developing roller 31 to uniformize the toner concentration in the developer container. The agitator member 34 is not limited to an agitator member that rotates. For example, a agitator member that swings may be employed.

In the opening portion of the developer container 32 where the developing roller 31 is disposed, a developing blade 35 is disposed to regulate the amount of toner born on the developing roller 31. The layer of toner supplied to the surface of the developing roller 31 is uniformly thinned and is charged to a negative polarity by triboelectric charging while passing through a portion facing the developing blade 35 as the developing roller 31 rotates.

As illustrated in FIGS. 1A and 1B, the feed unit 60 includes a front door 61 that is supported by the printer body 400 in an openable and closable manner, a tray unit 62, an intermediate plate 63, a tray spring 64, and a pick-up roller 65. The tray unit 62 constitutes the bottom surface of a recording medium storage space that appears when the front door 61 is open, and the intermediate plate 63 is supported by the tray unit 62 in an elevating manner. The tray spring 64 urges the intermediate plate 63 upward and presses the recording medium P stacked on the intermediate plate 63 against the pick-up roller 65. The front door 61 closes the recording medium storage space when closed against the printer body 400 and supports the recording medium P together with the tray unit 62 and the intermediate plate 63 when opened against the printer body 400.

The fixing unit 70 is of a thermal fixing type that performs an image fixing process by heating and melting the toner on the recording medium. The fixing unit 70 includes a fixing film 71, a fixing heater, such as a ceramic heater that heats the fixing film 71, a thermistor that measures the temperature of the fixing heater, and a pressure roller 72 that is in pressure contact with the fixing film 71.

A control system of the image forming apparatus 1 is described below.

Figure 25:
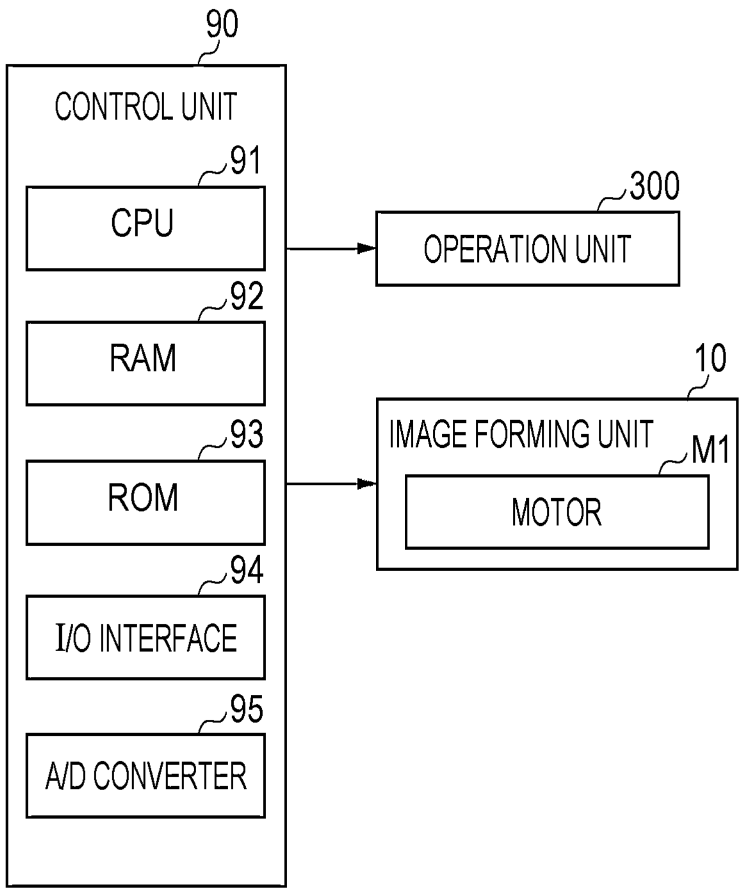
FIG. 25 is a system configuration diagram of an image forming apparatus.

FIG. 25 is a block diagram of the control system of the image forming apparatus 1. A control unit 90 serving as a control unit of the image forming apparatus 1 includes a central processing unit (CPU) 91 with one or more processors, circuitry, or combinations thereof serving as an arithmetic unit, a random access memory (RAM) 92 used as a work area of the CPU 91, and a read only memory (ROM) 93 that stores a variety of programs. The control unit 90 further includes an I/O interface 94 serving as an input/output port that is connected to an external device, and an A/D converter 95 that converts an analog signal into a digital signal.

An image forming operation performed by the image forming apparatus 1 is described below. When an image forming command is input to the image forming apparatus 1, the image forming process performed by the image forming unit 10 is started on the basis of image information input from an external computer or the reader device 200 connected to the image forming apparatus 1. As illustrated in FIGS. 1A and 1B, a scanner unit 11 emits a laser beam to the photoconductive drum 21 on the basis of the input image information. At this time, the photoconductive drum 21 is pre-charged by the charging roller 22, and an electrostatic latent image is formed on the photoconductive drum 21 by the emitted laser beam. Thereafter, the electrostatic latent image is developed by the developing roller 31, so that a toner image is formed on the photoconductive drum 21.

In parallel with the image forming process described above, the pick-up roller 65 of the feed unit 60 feeds the recording medium P supported by the front door 61, the tray unit 62, and the intermediate plate 63. The recording medium P is fed to the registration roller pair 15 by the pick-up roller 65, and skew is corrected when the recording medium P hits against the nip of the registration roller pair 15. The registration roller pair 15 is then driven in synchronization with the transfer timing of the toner image to convey the recording medium P toward a transfer nip formed by the transfer roller 12 and photoconductive drum 21.

A transfer voltage is applied to the transfer roller 12 serving as a transfer unit from a transfer high-voltage power supply, and the toner image born on the photoconductive drum 21 is transferred to the recording medium P conveyed by the registration roller pair 15. The recording medium P having the toner image transferred thereon is conveyed to the fixing unit 70, where the toner image is heated and pressurized as the toner image passes through the nip between the fixing film 71 and the pressure roller 72 in the fixing unit 70. Thus, the toner particles are melted and then solidified, so that the toner image is firmly fixed onto the recording medium P. The recording medium P that has passed through the fixing unit 70 is discharged to the outside of the image forming apparatus 1 (the outside of the apparatus) by the discharge roller pair 80 serving as a discharge unit and is stacked onto a discharge tray 81 serving as a stacking unit formed in the upper section of the printer body 400.

The discharge tray 81 is inclined upward toward the downstream side in the discharge direction of the recording medium, and the recording medium discharged onto the discharge tray 81 slides down the discharge tray 81. Thus, the trailing edges of the recording media discharged onto the discharge tray 81 are aligned by a regulation surface 84.

The reader device 200 includes a reading unit 201 that has a reader (not illustrated) inside, and a pressure plate 202 that is supported by the reading unit 201 in an openable and closable manner. Original base plate glass 203 that transmits light emitted from the reader is provided on the top surface of the reading unit 201. An original is placed on the original base plate glass 203.

When a user causes the reader device 200 to read the image of an original, the user places the original on the original base plate glass 203 with the pressure plate 202 open. The user then closes the pressure plate 202 to prevent misalignment of the original placed on the original base plate glass 203. Thereafter, the user outputs a read command to the image forming apparatus 1 by, for example, operating the operation unit 300. When the reading operation is started, the reader in the reading unit 201 moves back and forth in the sub-scanning direction, that is, the reader moves back and forth in the right-left direction with the operation unit 300 of the image forming apparatus 1 facing the front. The reader emits light from the light emitting unit to the original, receives the light reflected by the original by using the light receiving unit, and photoelectrically converts the received light. Thus, the reader reads the image of the original. In the following description, the front-back direction, the right-left direction, and the up-down direction are defined under the condition that the operation unit 300 faces the front.

Figure 2:
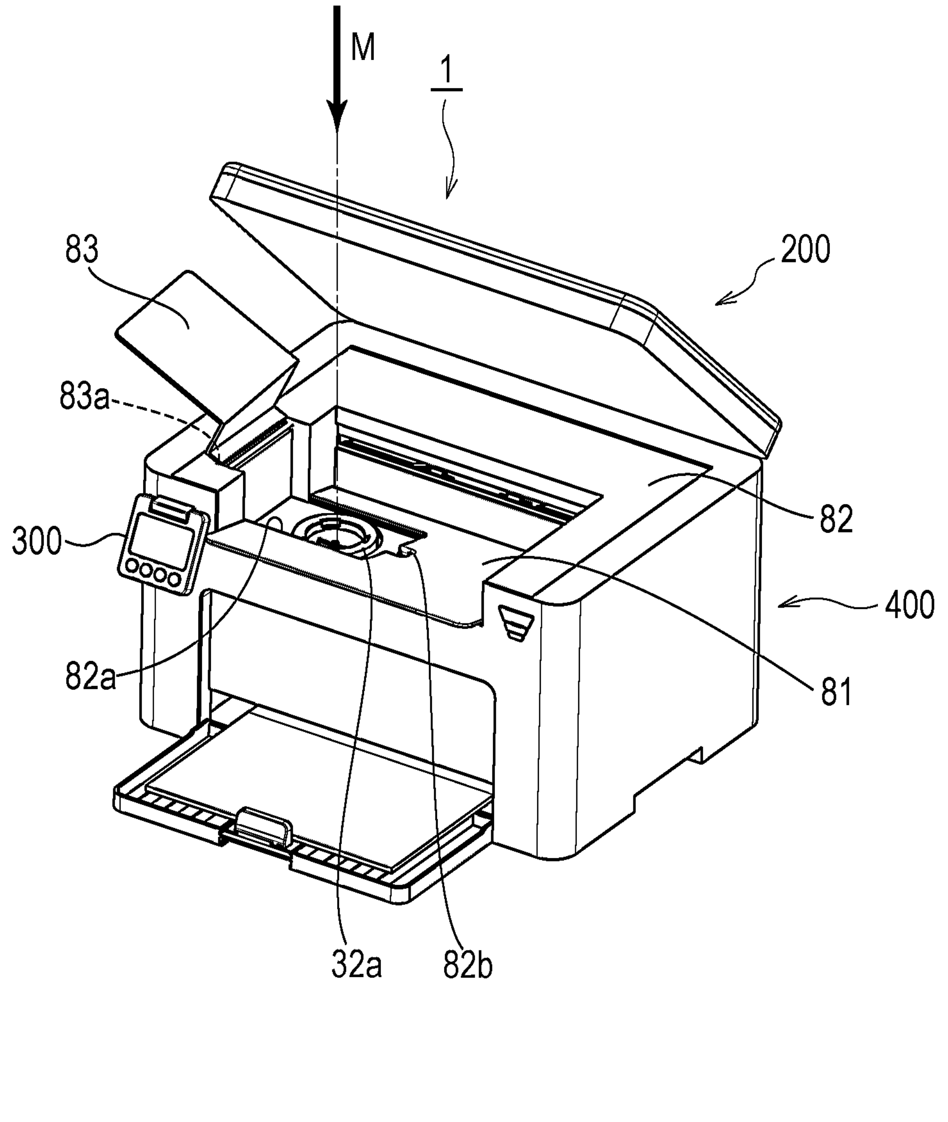
FIG. 2 is a perspective view of an opening and closing member and a supply port.

The discharge tray 81 is formed on the top surface of a top cover 82 in the upper portion of the printer body 400. As illustrated in FIGS. 1B and 2, an opening and closing member 83 is supported by the top cover 82 in a openable and closable manner about a rotary shaft 83$a$ extending in the front-back direction. An opening portion 82*a* is formed in the discharge tray 81 of the top cover 82 so as to open upward.

The opening and closing member 83 is configured to be movable between a closed position and an open position. In the closed position, the opening and closing member 83 covers a supply port 32*a* so that a toner pack (toner container) 100 cannot be mounted to the developer container 32. In the open position, the supply port 32*a* is exposed so that the toner pack 100 can be mounted to the developer container 32. When the opening and closing member 83 is in the open position, the toner pack 100 is moved in a mounting direction M toward the supply port 32*a* and is mounted to the supply port 32*a*.

The opening and closing member 83 functions as part of the discharge tray 81 in the closed position. The opening and closing member 83 and the opening portion 82*a* are formed on the left side of the discharge tray 81. The opening and closing member 83 is opened to the left when the user hooks their finger on the opening and closing member 83 through a groove 82*b* provided on the top cover 82 to open. The opening and closing member 83 is formed in a substantially L-shape along the shape of the top cover 82.

The opening portion 82*a* of the discharge tray 81 is open so that the supply port 32*a* formed in the upper portion of the developer container 32 to supply toner is exposed, and the user can access the supply port 32*a* by opening the opening and closing member 83. According to the present embodiment, the user supplies toner from the toner pack 100 (refer to FIGS. 1A and 1B) filled with toner to be supplied to the developing device 30 with the developing device 30 mounted to the image forming apparatus 1 (a direct supply method). The toner pack 100 is configured to be removable from a mounting unit 106 (refer to FIGS. 22A and 22B) of the image forming apparatus 1. When being mounted, at least part of the toner pack 100 is exposed to the outside.

According to the present configuration, it is not necessary to remove the entire process unit 20 including a portion that contains toner from the printer body 400 and replace the process unit 20 with a new one when supplying toner. Therefore, when the remaining toner in the process unit 20 becomes low, an operation that is used by other configurations can be removed in the present configuration, which improves the usability.

In addition, toner can be supplied to the developer container 32 at a lower cost than replacing the entire process unit 20. The direct supply method is also less expensive than replacing only the developing device 30, which is responsible for the developing function of the process unit 20, because various rollers, gears, and the like need not be replaced together. The image forming apparatus 1 and the toner pack 100 constitute an image forming system 1000.

Mounting Unit

Figure 3A:
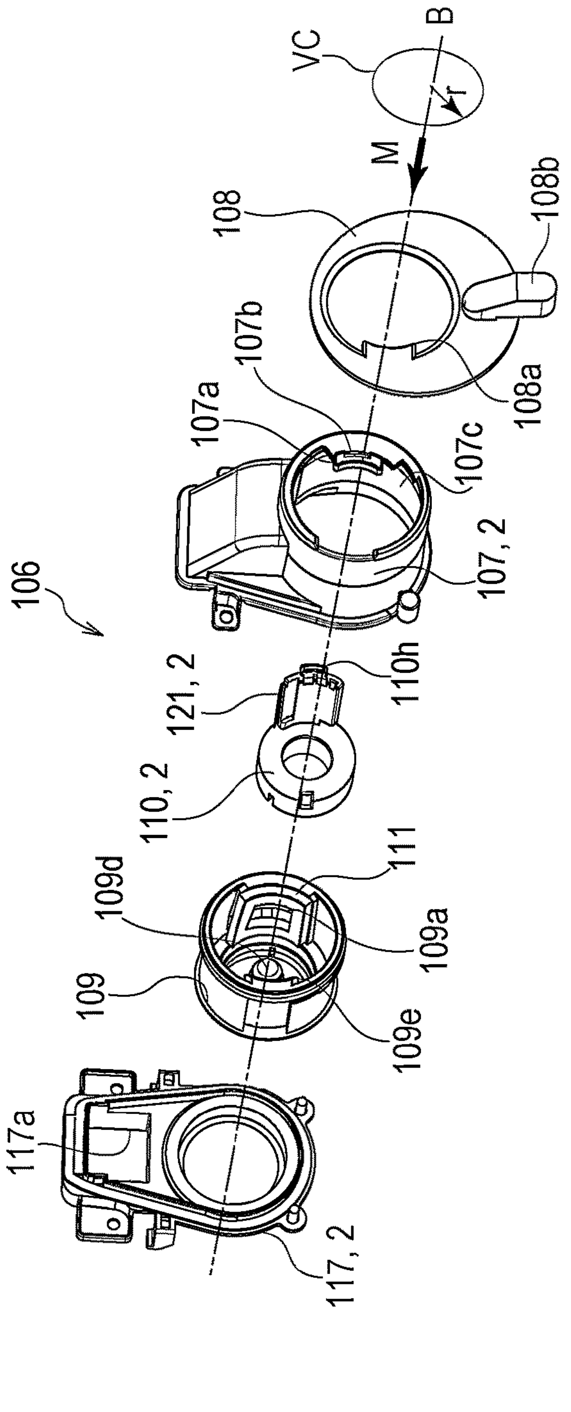
FIG. 3A is an exploded perspective view of a mounting unit.
Figure 3B:
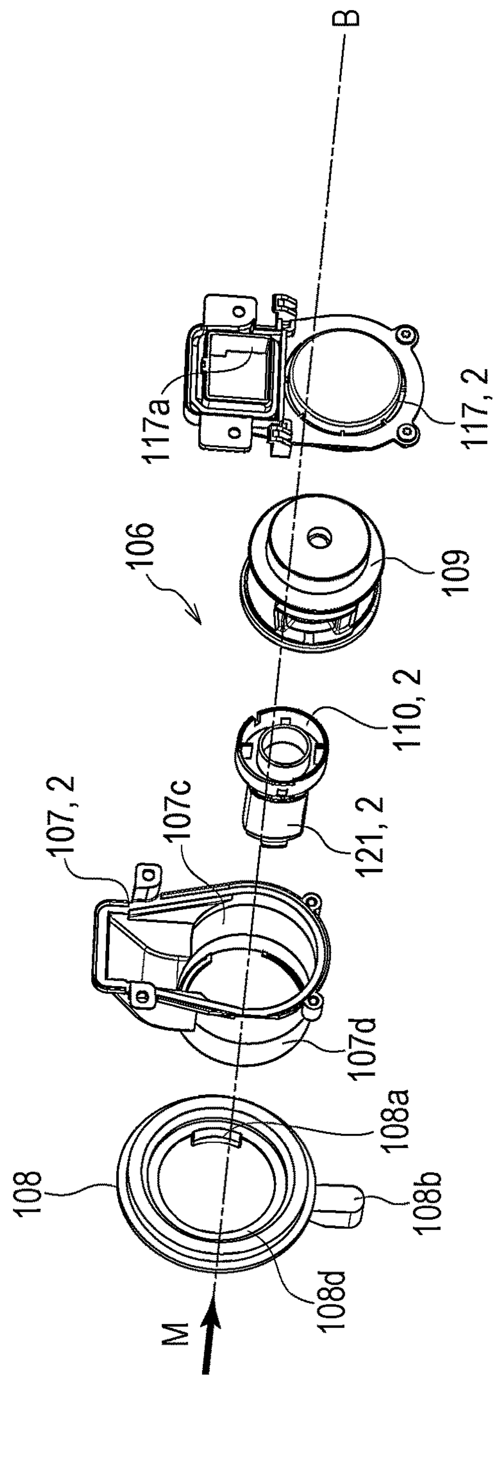
FIG. 3B is an exploded perspective view of the mounting unit as viewed from a different direction than in FIG. 3A.
Figure 4A:
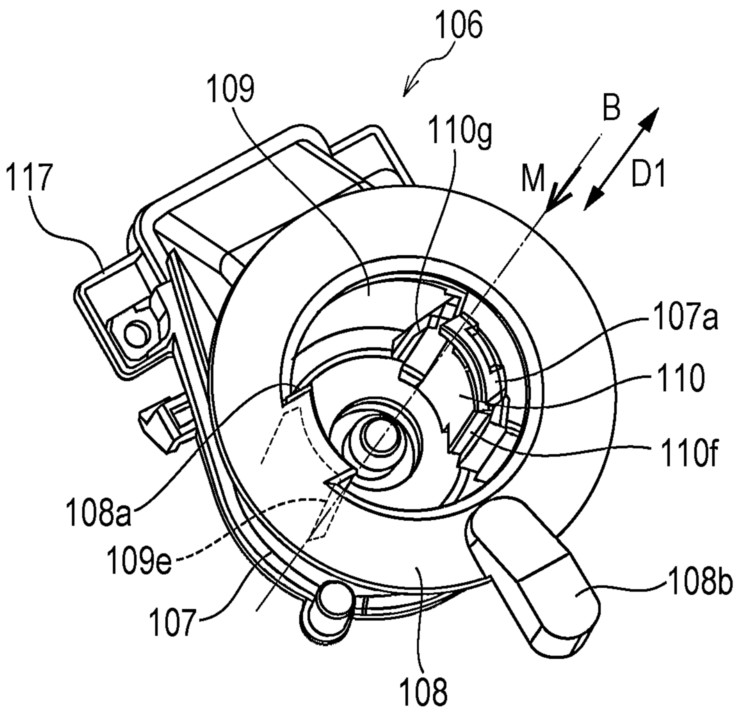
FIG. 4A is a perspective view of the exterior appearance of the mounting unit when a control lever is in the closed position.
Figure 4B:
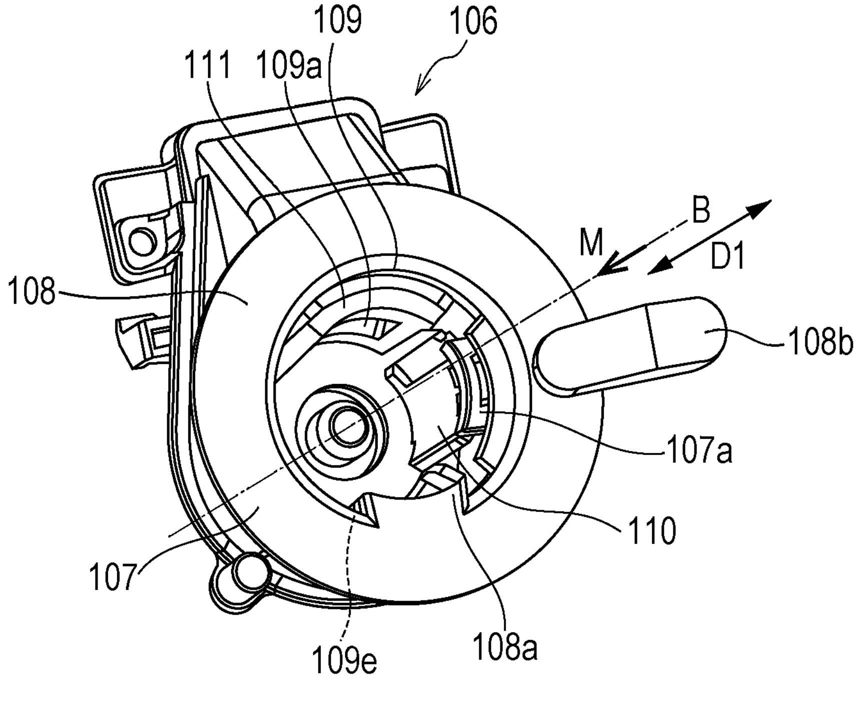
FIG. 4B is a perspective view of the exterior appearance of the mounting unit when the control lever is in the open position.
Figure 5A:
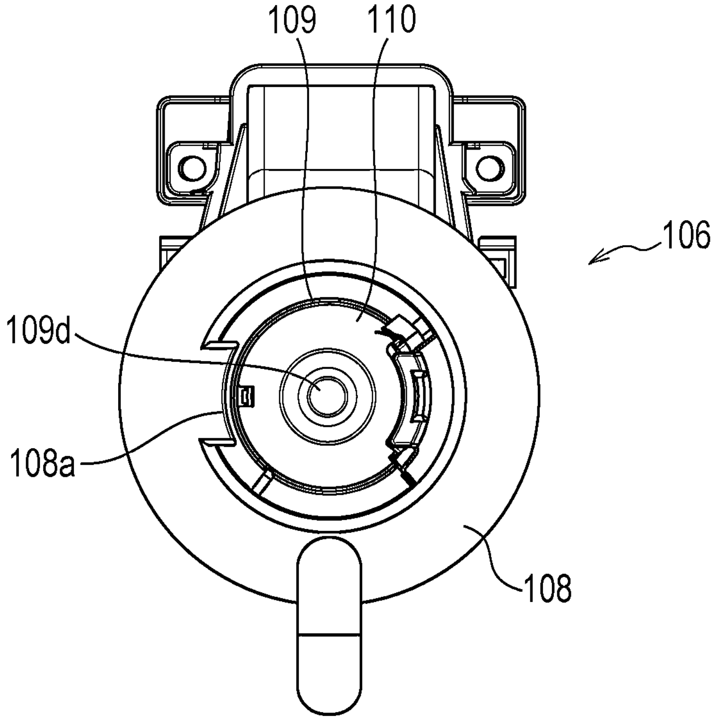
FIG. 5A is a plan view of the exterior appearance of the mounting unit when the control lever is in the closed position.
Figure 5B:
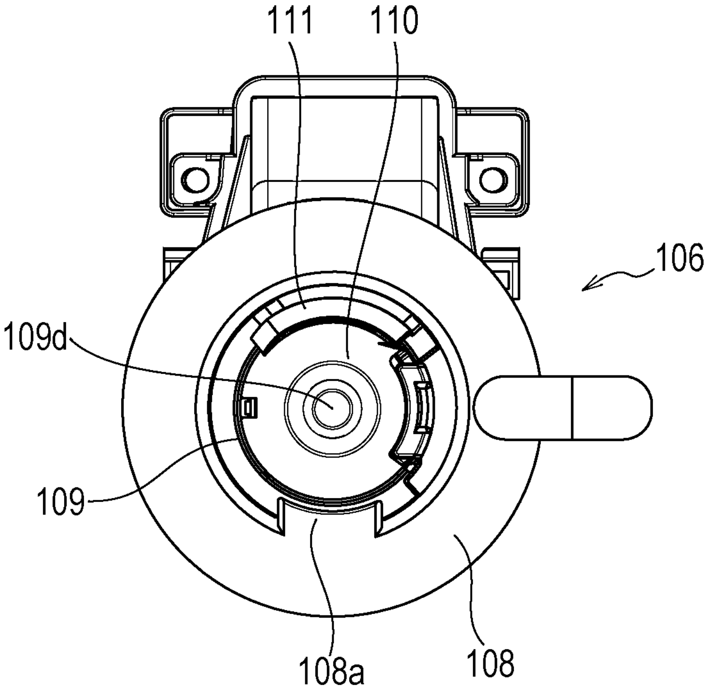
FIG. 5B is a plan view of the exterior appearance of the mounting unit when the control lever is in the open position.

The configuration of the mounting unit 106 to which the toner pack 100 is mounted is described below with reference to FIGS. 3A to 7B. According to the present embodiment, the mounting unit 106 is a unit for mounting the toner pack 100 and includes the supply port 32*a*. The mounting unit 106 is provided in the image forming apparatus 1 (refer to FIG. 2). FIG. 3A is an exploded perspective view of the mounting unit 106. FIG. 3B is an exploded perspective view of the mounting unit 106 as viewed from a different direction than in FIG. 3A. FIGS. 4A and 5A are a perspective view of the exterior appearance of the mounting unit 106 and a plan view as viewed from the mounting direction M, respectively, with a control lever 108 in the closed position. FIGS. 4B and 5B are a perspective view of the exterior appearance of the mounting unit 106 and a plan view as viewed from the mounting direction M, respectively, with a control lever 108 in the open position.

Figure 6A:
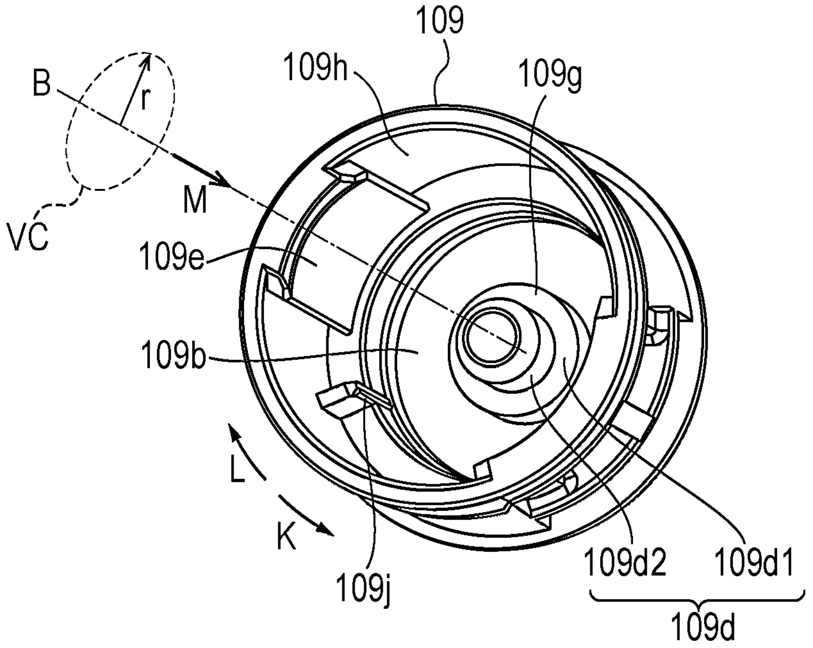
FIG. 6A is a perspective view of an apparatus side shutter as viewed from the upstream side in the mounting direction.
Figure 6B:
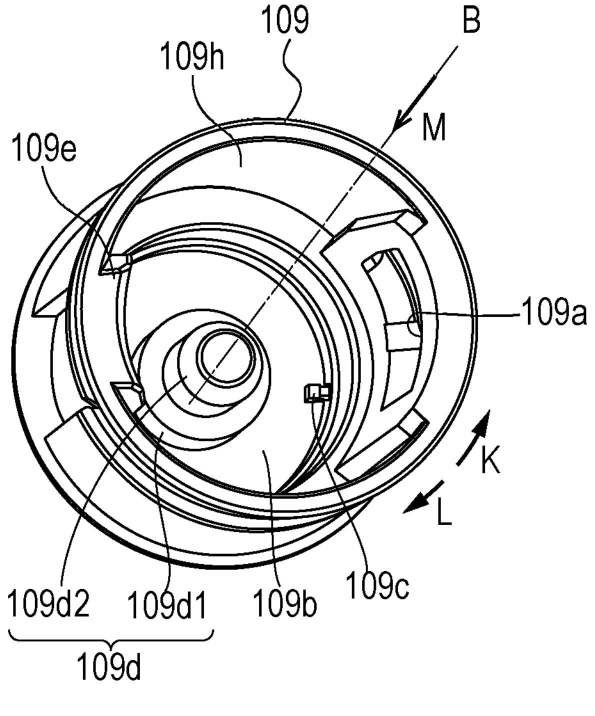
FIG. 6B is a perspective view of the apparatus side shutter as viewed from a different perspective than in FIG. 6A.
Figure 7A:
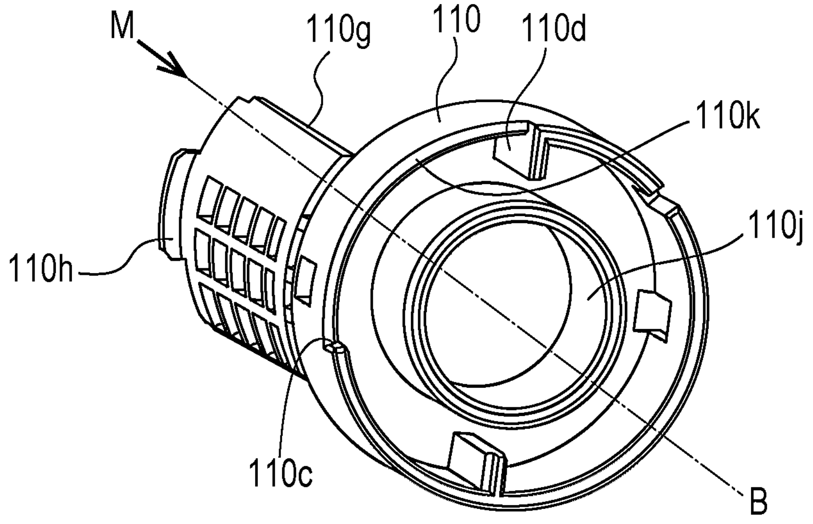
FIG. 7A is a perspective view of a cover as viewed from the downstream side in the mounting direction.
Figure 7B:
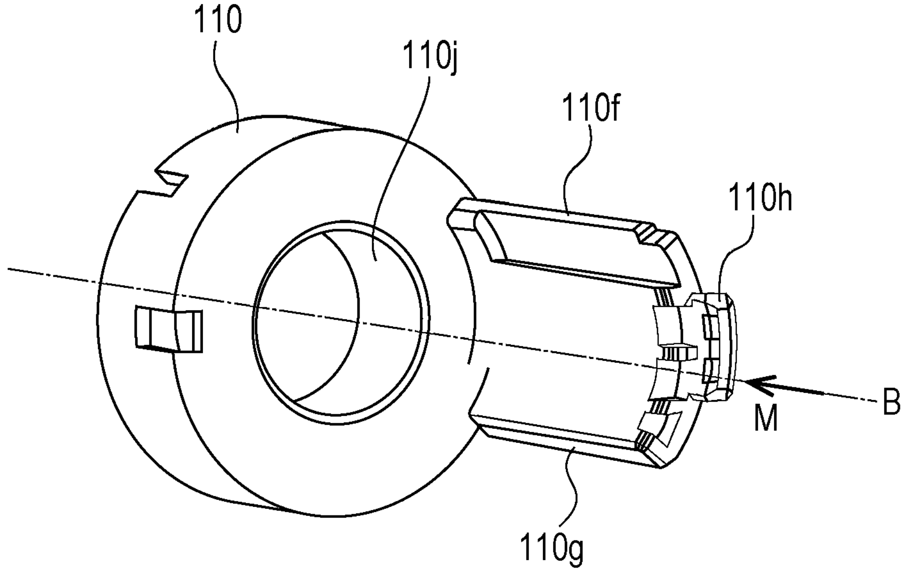
FIG. 7B is a perspective view of the cover as viewed from the upstream side in the mounting direction.

FIG. 6A is a perspective view of an apparatus side shutter 109 as viewed from the upstream side in the mounting direction M. FIG. 6B is a perspective view of the apparatus side shutter 109 from a different perspective than in FIG. 6A. FIG. 7A is a perspective view of the cover 110 as viewed from the downstream side in the mounting direction M. FIG. 7B is a perspective view of the cover 110 as viewed from the upstream side in the mounting direction M.

As illustrated in FIGS. 3A to 4B, the mounting unit 106 includes a body base 2. The body base 2 includes a first frame 107, a second frame 117, and a cover 110. The cover 110 and the second frame 117 are fixed to the first frame 107. As illustrated in FIGS. 7A and 7B, the cover 110 includes an engaged portion 110*h* that is engaged with a positioning portion 107*a* of the first frame 107 so as not to rotate about a rotational axis B relative to the first frame 107. A notch 110*k* is provided on the downstream side, that is, bottom surface side of the cover 110 in the mounting direction M. The notch 110*k* has a first regulating surface 110*c* and a second regulating surface 110*d*.

The first regulating surface 110*c* and the second regulating surface 110*d* are provided facing each other in the circumferential direction around the rotational axis B.

The first frame 107, the cover 110, and the second frame 117 need not be separate members and may be integrated into one body. As illustrated in FIGS. 3A and 3B, the second frame 117 has an apparatus side opening 117*a* that communicates with a toner storage portion 36 (refer to FIG. 1A) of the developer container 32.

The control lever 108 and the apparatus side shutter 109 are each mounted to the body base 2 in a rotatable manner about the rotational axis B. The first frame 107 includes the positioning portion 107*a*. The positioning portion 107*a* protrudes inward more than the inner peripheral surface of the first frame 107 centered on the rotational axis B in the radial direction r of a virtual circle VC centered on the rotational axis B.

The control lever 108 serving as an operation unit includes a drive transmission portion 108*a* and an operation portion 108*b*. The user can operate the operation portion 108*b* to rotate the control lever 108 about the rotational axis B relative to the body base 2. As illustrated in FIG. 3A, the drive transmission portion 108*a* is a convex portion protruding inward more than the inner peripheral surface of the control lever 108 centered on the rotational axis B in the radial direction r of a virtual circle VC centered on the rotational axis B.

As illustrated in FIGS. 6A and 6B, the apparatus side shutter 109 serving as a main body shutter has an inner peripheral surface 109*h*, a receiving port 109*a* that is formed in the inner peripheral surface 109*h* and that receives toner from the toner pack 100, and a bottom surface 109*b*. The apparatus side shutter 109 further includes a center boss 109*d* provided on the bottom surface 109*b*, a pack contact surface 109*g*, a regulated rib 109*c*, and a driven transmission portion 109*e* provided on the inner peripheral surface 109*h*. As illustrated in FIG. 6A, the driven transmission portion 109*e* is a convex portion protruding inward in the radial direction r of the virtual circle VC centered on the rotational axis B. An apparatus side seal 111 is bonded to the inner peripheral surface 109*h* so as to surround the receiving port 109*a* (refer to FIG. 4B).

The apparatus side shutter 109 is configured to be in a shielding position or an open position for the body base 2.

More specifically, as illustrated in FIGS. 6A and 6B, the apparatus side shutter 109 rotates in the direction of arrow K from the shielding position to the open position and in the direction of arrow L from the open position to the shielding position. The directions of arrow K and L are the same as the directions of the arrow K and L of the pack side shutter 103 illustrated in FIG. 12B. In the shielding position of the apparatus side shutter 109, the receiving port 109*a* is shielded by the apparatus side seal 111 and the cover 110. In the open position, the receiving port 109*a* is open without being covered by the cover 110. That is, when the apparatus side shutter 109 is in the shielding position, the receiving port 109*a* does not communicate with the apparatus side opening 117*a* of the second frame 117. When the apparatus side shutter 109 is in the open position, the receiving port 109*a* communicates with the apparatus side opening 117*a* of the second frame 117.

In FIGS. 4A and 5A, the apparatus side shutter 109 is in the shielding position. At this time, the receiving port 109*a* of the apparatus side shutter 109 does not communicate with the apparatus side opening 117*a* of the second frame 117. In FIGS. 4B and 5B, the apparatus side shutter 109 is in the open position and, at this time, the receiving port 109*a* of the apparatus side shutter 109 communicates with the apparatus side opening 117*a* of the second frame 117. By moving the apparatus side shutter 109 to the open position, toner can be refilled (supplied) from the toner pack 100 to the toner storage portion 36 of the developer container 32 via the receiving port 109*a*.

Since the control lever 108 and the apparatus side shutter 109 are not connected in driving, the apparatus side shutter 109 does not rotate even when the control lever 108 is operated with the toner pack 100 unmounted.

As illustrated in FIGS. 6A to 7B, the apparatus side shutter 109 is configured to be rotatable around the center boss 109*d* because a large-diameter portion 109*d*1 of the center boss 109*d* is engaged with a cylindrical portion 110*j* of the cover 110. The regulated rib 109*c* provided on the bottom surface 109*b* of the apparatus side shutter 109 is located between the first regulating surface 110*c* and the second regulating surface 110*d* of the cover 110. For this reason, the apparatus side shutter 109 can rotate only within a range in which the regulated rib 109*c* can move between the first regulating surface 110*c* and the second regulating surface 110*d*. That is, rotation of the apparatus side shutter 109 is regulated within a rotational range between the shielding position and the open position by the first regulating surface 110*c* and the second regulating surface 110*d* of the cover 110. For example, when the regulated rib 109*c* is in contact with the first regulating surface 110*c*, the apparatus side shutter 109 that is in the shielding position cannot rotate in the direction of arrow L, that is, in a direction opposite to the direction toward the open position.

Configuration of Container

Figure 8A:
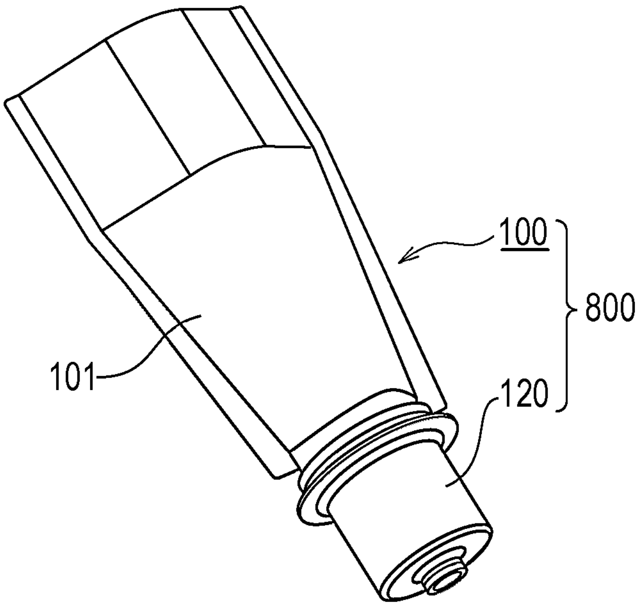
FIG. 8A is a perspective view of a container.
Figure 8B:
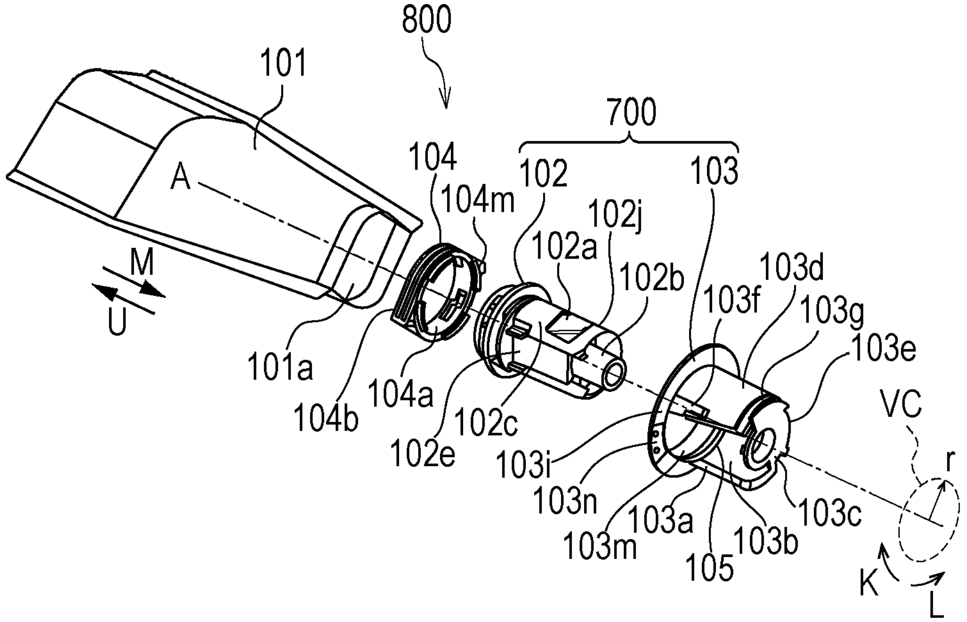
FIG. 8B is an exploded perspective view of the container.
Figure 9A:
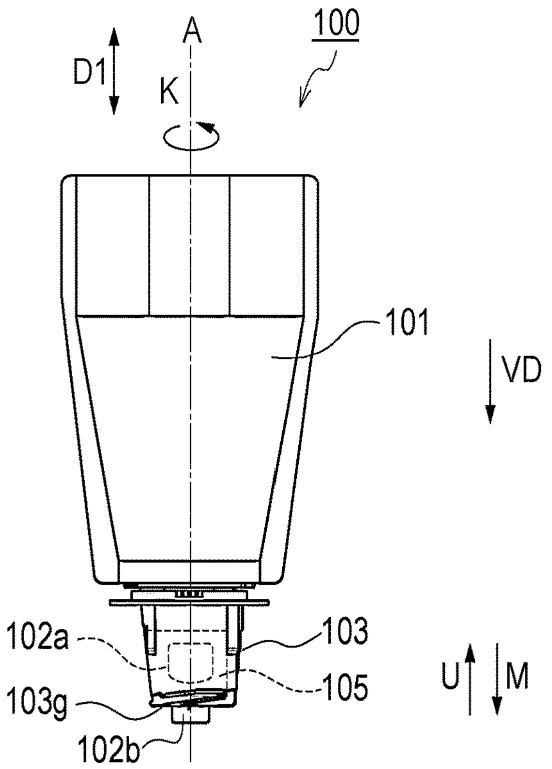
FIG. 9A is a side view of a toner pack when a pack side shutter is in a shielding position.
Figure 9B:
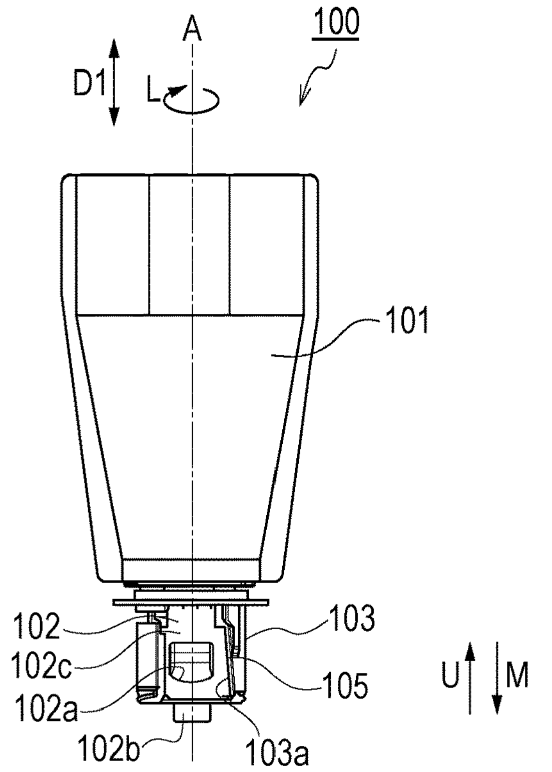
FIG. 9B is a side view of the toner pack when the pack side shutter is in an open position.

The basic configuration of a container 800 including the toner pack 100 is described below with reference to FIGS. 8A to 9B. The toner pack 100 is mounted to the mounting unit 106 described above. FIG. 8A is a perspective view of the container 800. FIG. 8B is an exploded perspective view of the container 800. FIG. 9A is a side view of the toner pack 100 when a pack side shutter 103 is in the shielding position. FIG. 9B is a side view of the toner pack 100 when the pack side shutter 103 is in the open position.

As illustrated in FIG. 8A, the container 800 serving as a container includes the toner pack 100 and a film 120 serving as a protective member. The container 800 and the image forming apparatus 1 constitute the image forming system 1000 (refer to FIG. 1A). As illustrated in FIG. 8B, the toner pack 100 includes a pouch 101 that contains toner and other contents and a mounted unit 700 that is mounted to the mounting unit 106. An opening member 104 serving as the opening portion is joined to an opening 101*a* of the pouch 101. The mounted unit 700 serving as a front end portion includes a nozzle 102 that is joined to the opening member 104 and the pack side shutter 103. According to the present embodiment, the film 120 covers the mounted unit 700 and is removable to expose the mounted unit 700 by a user or a maintenance technician. The film 120 is described in more detail below.

The pouch 101 which is a part of the storage portion is flexible and is provided at one end of the toner pack 100 in an axial direction D1, which is the direction of the rotational axis A of the cylindrical portion of the pack side shutter 103. The axial direction D1, which is the direction of the rotational axis A, is also a direction in which the opening member 104 is joined to the pouch 101 and a direction in which the nozzle 102 of the mounted unit 700 is joined to and aligned with the opening member 104, and therefore is joined to and aligned with the pouch 101, which is a container portion. The axial direction D1 is also referred to as a "first direction". As used herein, the term "one end" refers to an end opposite to the end where the pouch 101 is open in the axial direction D1. Since the rotational axis A coincides with the rotational axis B of the apparatus side shutter 109 when the toner pack 100 is mounted to the mounting unit 106, both the axial directions of the rotational axes A and B are hereinafter referred to as the axial direction D1. The nozzle 102 and the pack side shutter 103 are provided at the other end of the toner pack 100 in the axial direction D1. The other end is an end where the pouch 101 is open in the axial direction D1. For example, the pouch 101 is formed by undergoing a pouch process and laminating flexible polypropylene sheets so as to have a pouch shape with one end open as an opening 101*a*. At least one of the two outer surfaces of the pouch 101 is one of the surfaces formed from a flexible polypropylene sheet that undergoes a pouch process and laminated together. On the outer surface of the pouch 101, instructions 500 are printed letting the user know how to supply toner and precautions for use when the user supplies toner. Thus, the user or maintenance technician is informed of the toner supply procedure and precautions and can supply toner on the basis of the information. The pouch 101 may be made of paper or may be replaced by a toner bottle. The toner bottle has a flexible cylindrical side surface and an opening at one end in the rotational axis direction of the cylindrical shape.

The opening member (a joint member) 104 serving as an intermediate member is a annular resin member having a through-hole 104*a*. The opening member 104 is fixed to the opening 101*a* of the pouch 101. According to the present embodiment, the opening member 104 is made of a polypropylene resin and has a greater thickness and a higher rigidity than the pouch 101, which is made from a flexible sheet. That is, pouch 101 has a first rigidity, and the opening member 104 has a second rigidity that is higher than the first rigidity. This allows the opening 101*a* to remain open even if the pouch 101 is flexible. However, as described below, the nozzle 102 of the mounted unit 700 also has a higher rigidity than the pouch 101. Therefore, even if the pouch 101 and the nozzle 102 are joined without using the opening member 104, the opening 101*a* can remain open even in the pouch 101 that is flexible.

The opening member 104 is joined to the nozzle 102 and has a through-hole 104*a*. That is, the opening member 104 connects the pouch 101 to the mounted unit 700 including the pouch 101 and the nozzle 102 so that the pouch 101 and the mounted unit 700 communicate with each other. However, the pouch 101 and the nozzle 102 may be configured to be joined without using the opening member 104.

Furthermore, the opening member 104 includes a pair of extending portions 104*b* each extending from the outer peripheral surface away from the rotational axis A in the radial direction r of the virtual circle VC centered on the rotational axis A. The two extending portions 104*b* are disposed at phases that differ from each other by 180 degrees in the circumferential direction around the rotational axis A. As described above, since the outer peripheral surface of the opening member 104 is not a uniform peripheral surface around the rotational axis A, the user can grasp the opening member 104 stably by grasping the extending portions 104*b*. That is, the extending portion 104*b* functions as a non-skid strip to prevent the user's hand from slipping in the rotation direction around the rotational axis A.

The nozzle 102 serving as a discharge portion is joined to the opening member 104. Any joining method can be employed. For example, as the joining method, a method using a variety of adhesive agents, such as hot melt, or a method in which the through-hole 104*a* of the opening member 104 is thermally welded to the outer periphery of the nozzle 102. In addition, any method for joining the pouch 101 to the opening member 104 can be employed. Alternatively, the pouch 101 and the nozzle 102 may be joined without using the opening member 104.

The nozzle 102 has a side surface 102*c* as an outer surface extending along the rotational axis A. The side surface 102*c* has, thereon, a discharge port 102*a* configured to communicate with the interior of the pouch 101 and a recess 102*e*. The recess 102*e* is provided at a position different from the position of the discharge port 102*a* in the rotation direction of the pack side shutter 103. The configuration is such that toner stored in the pouch 101 is discharged out of the toner pack 100 via the discharge port 102*a* when the pouch 101 is squeezed by, for example, the user's hand to reduce the volume of the pouch 101. That is, a passage is formed inside of the nozzle 102 as the discharge portion to allow toner (contents) to pass toward the discharge port 102*a*. The nozzle 102 may be integrated with the opening member 104. Alternatively, a seal may be provided between the pouch 101 and the discharge port 102*a* of the nozzle 102 and, when the seal is removed, the pouch 101 and the discharge port 102*a* may communicate with each other. The pack side shutter 103 serving as a shielding member is disposed outside of a side surface 102*c* of the nozzle 102.

The pack side shutter 103 is provided so as to be rotatable about a rotational axis A extending in the axial direction D1 and have an opening 103*a*. More specifically, an inner peripheral surface 103*m* of the pack side shutter 103 is supported in a slidable manner against an annular rib 104*m* of the opening member 104. The pack side shutter 103 is provided outside of the side surface 102*c* in the radial direction r of the virtual circle VC centered on the rotational axis A and can shield the discharge port 102*a*. The arcuate side surface 102*c* is a curved surface that is convex toward the outside in the radial direction r. The inner surface of the pack side shutter 103, that is, the surface opposite the side surface 102*c*, is a curved surface extending along the side surface 102*c* of the nozzle 102. A substantially rectangular-shaped pack side seal 105 is attached to the inner surface of the pack side shutter 103.

The pack side shutter 103 is configured to be rotatable about the rotational axis A between a shielding position (the position illustrated in FIG. 9A), where the pack side seal 105 shields the discharge port 102*a* of the nozzle 102, and an open position (the position illustrated in FIG. 9B), where the discharge port 102*a* is open. When the pack side shutter 103 is in the open position, the discharge port 102*a* of the nozzle 102 is exposed through the opening 103*a* formed in the pack side shutter 103. That is, the pack side shutter 103 has the opening 103*a* so that the discharge port 102*a* is open when the pack side shutter 103 is in the open position.

When the pack side shutter 103 in a shielding position illustrated in FIG. 9A (a first shielding position) is rotated by the user in the direction of arrow K around the rotational axis A relative to the pouch 101, the pack side shutter 103 reaches an open position illustrated in FIG. 9B (a first open position).

In contrast, when the pack side shutter 103 in the open position is rotated in the direction of arrow L, the pack side shutter 103 reaches the shielding position. That is, the direction of arrow K (a first rotation direction) is a direction about the rotational axis A in which the pack side shutter 103 moves from the shielding position to the open position relative to the pouch 101. The direction of arrow L (a second rotation direction) is a direction about the rotational axis A in which the pack side shutter 103 moves from the open position to the shielding position. In the rotational movement of the pack side shutter 103, the pack side shutter 103 slides against the side surface 102*c* of the nozzle 102 via the pack side seal 105.

Figure 10A:
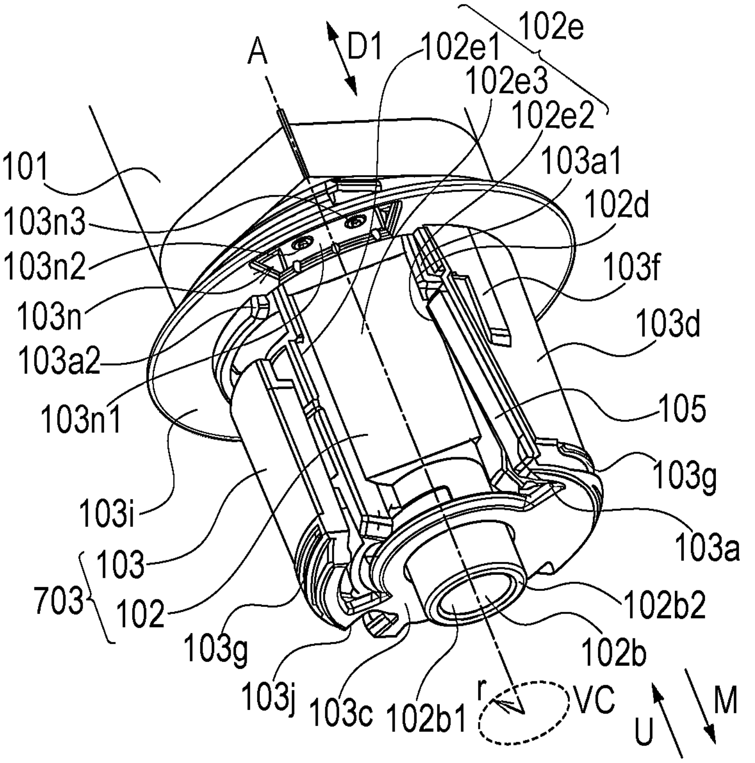
FIG. 10A is a perspective view of a mounted unit when the pack side shutter is in the shielding position.
Figure 10B:
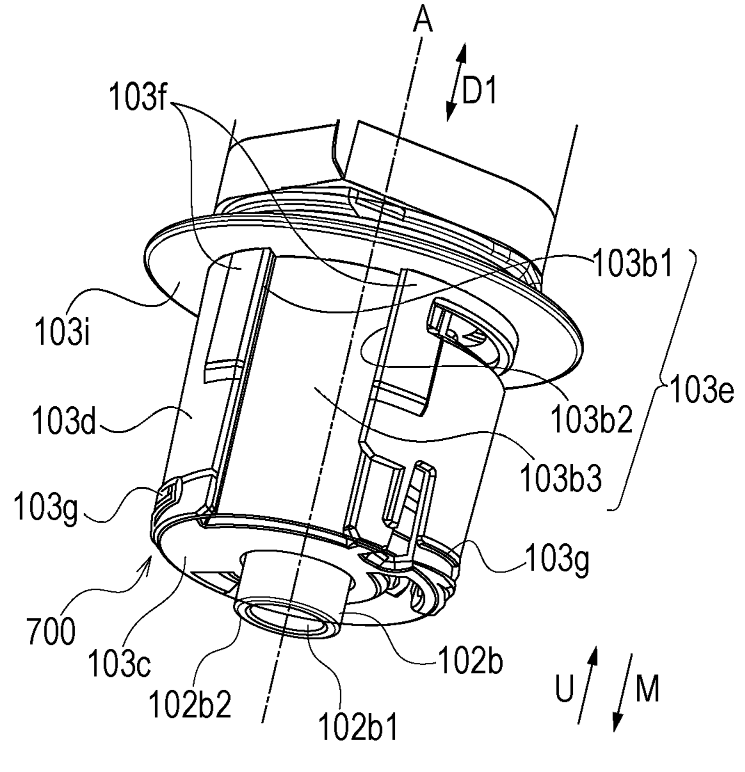
FIG. 10B is another perspective view of the mounted unit when the pack side shutter is in the shielding position.

The configurations of the nozzle 102 and the pack side shutter 103 are described in detail below with reference to FIGS. 8A to 10B. FIG. 10A is a perspective view of the mounted unit 700 when the pack side shutter 103 is in the shielding position. FIG. 10B is another perspective view of the mounted unit 700 when the pack side shutter 103 is in the shielding position.

As illustrated in FIGS. 8 to 10B, especially FIG. 10A, the nozzle 102 includes a positioned portion 102*d* having surfaces facing each other in the circumferential direction around the rotational axis A. The positioned portion 102*d* is engaged with the positioning portion 107*a* (FIG. 4A) of the first frame 107 when the toner pack 100 is mounted to the mounting unit 106. This configuration determines the position of the nozzle 102 relative to the first frame 107 (the body base 2) in the rotation direction around the rotational axis A.

In the direction of the rotational axis A (both directions), surfaces 102*e*1 and 102*e*2 are provided on the downstream side in the mounting direction M, which is the direction (one direction) in which the positioned portion 102*d* is mounted to the supply port 32*a* of the printer body 400. The side surface 102*e*3 is recessed inward from the side surface 102*c* in the radial direction r. The positioned portion 102*d*, the surface 102*e*1, the surface 102*e*2, and the side surface 102*e*3 form the recess 102*e*.

The opening 103*a* is provided in a side surface 103*d* of the pack side shutter 103.

The side surface 103*d* extends along the rotational axis A. As illustrated in FIG. 10A, when the pack side shutter 103 is in the shielding position, at least part of the recess 102*e* of the nozzle 102 is exposed from the opening 103*a*. This is to engage the positioned portion 102*d* of the recess 102*e* with the positioning portion 107*a* when the toner pack 100 is mounted to the mounting unit 106 with the pack side shutter 103 in the shielding position.

As illustrated in FIG. 10B, the pack side shutter 103 further includes a driven transmission portion 103*e* on the opposite side of the rotational axis A from the opening 103*a*. When the pack side shutter 103 is in the shielding position, the driven transmission portion 103*e* is provided on the opposite side of the rotational axis A from the recess 102*e* of the nozzle 102. The driven transmission portion 103*e* has surfaces 103*b*1 and 103*b*2 and a side surface 103*b*3 and can be engaged with the drive transmission portion 108*a* of the control lever 108 described below. The side surface 103*b*3 is provided between the surfaces 103*b*1 and 103*b*2 and is recessed inward from the side surface 103*d* in the radial direction r.

At the upstream end of the pack side shutter 103 in the mounting direction M, a disc-shaped flange 103*i* that is provided outside of the side surface 103*d* in the radial direction r, that is, that extends from the side surface 103*d* in a direction away from the rotational axis A is provided so as to be concentric with the cylindrical side surface 103*d*.

The pack side shutter 103, which forms a part of the storage portion, has the side surface 103*d* extending in the first direction in which the nozzle 102 extends. The side surface 103*d* is a circular cylindrical portion that has the disc-shaped flange with a diameter greater than a circular arc obtained by connecting the outer diameters of the side surface 103*d* and that is concentric with the side surface 103*d*. In addition, the side surface 103*d* has an end surface that is perpendicular to the rotational axis at the end adjacent to the nozzle in the first direction described above.

A protruding portion 102*b* of the nozzle 102 is described in detail below. As illustrated in FIGS. 9A and 9B, the toner pack 100 is oriented so that the side of the toner pack 100 with the opening in the mounting direction M (which may be called a second end side or a side with the nozzle 102) is lower than the side without the opening (which may be called a first end side or a side with the pouch 101) when the pack is mounted to the printer body 400. Alternatively, the toner pack 100 is oriented so that at least part of the nozzle 102 is lower than the pouch 101 when the toner pack 100 is mounted to the printer body 400 and, in addition, the rotational axis A is parallel to a vertical direction (the direction of gravitational force) VD. The toner pack 100 has the above-described posture when the toner pack 100 is mounted to the mounting unit 106 of the image forming apparatus 1. At this time, in FIGS. 9A to 10B, the mounting direction M is the downward direction when the toner pack 100 is mounted to the printer body 400. Similarly, an unmount direction U is the upward direction.

The pack side shutter 103 has an end surface 103*c*, which is the lower end surface in the vertical direction VD when mounted to the printer body 400 and which constitutes the bottom surface of the pack side shutter 103 that is perpendicular to the rotational axis A. The nozzle 102 includes a protruding portion 102*b* that protrudes downstream in the mounting direction M from the end surface 103*c* of the pack side shutter 103, that is, protrudes downward. As used herein, the term "downward" refers to a direction in which the toner pack 100 faces downstream when the toner pack 100 is mounted to the printer body 400 and refers to downstream in the mounting direction M when the toner pack 100 is moved to be mounted to the printer body 400.

The protruding portion 102*b* is a cylindrical portion (a portion having a cylindrical shape) centered on the rotational axis A.

The protruding portion 102*b* has a protruding-portion end surface 102*b*2 that is a lower end surface. The protruding-portion end surface 102*b*2 has a hole (portion) at the center. The hole has an inner peripheral surface 102*b*1 centered on the rotational axis A.

As illustrated in FIG. 8B, the protruding portion 102*b* protrudes downward from an end surface 102*j* in the mounting direction M of the nozzle 102 when the toner pack 100 is mounted to the printer body 400. According to the present embodiment, the end surface 103*c* of the pack side shutter 103 and the end surface 102*j* of the nozzle 102 are end surfaces perpendicular to the rotational axis A of the pack side shutter 103. However, the configuration is not limited thereto. These surfaces can be any surfaces that extend in a direction that intersects the rotational axis A when viewed in a direction perpendicular to the rotational axis A. That is, these surfaces may be further inclined at an angle from a plane perpendicular to the rotational axis A. The protruding portion 102*b* need not necessarily be provided in the nozzle 102.

Figure 11:
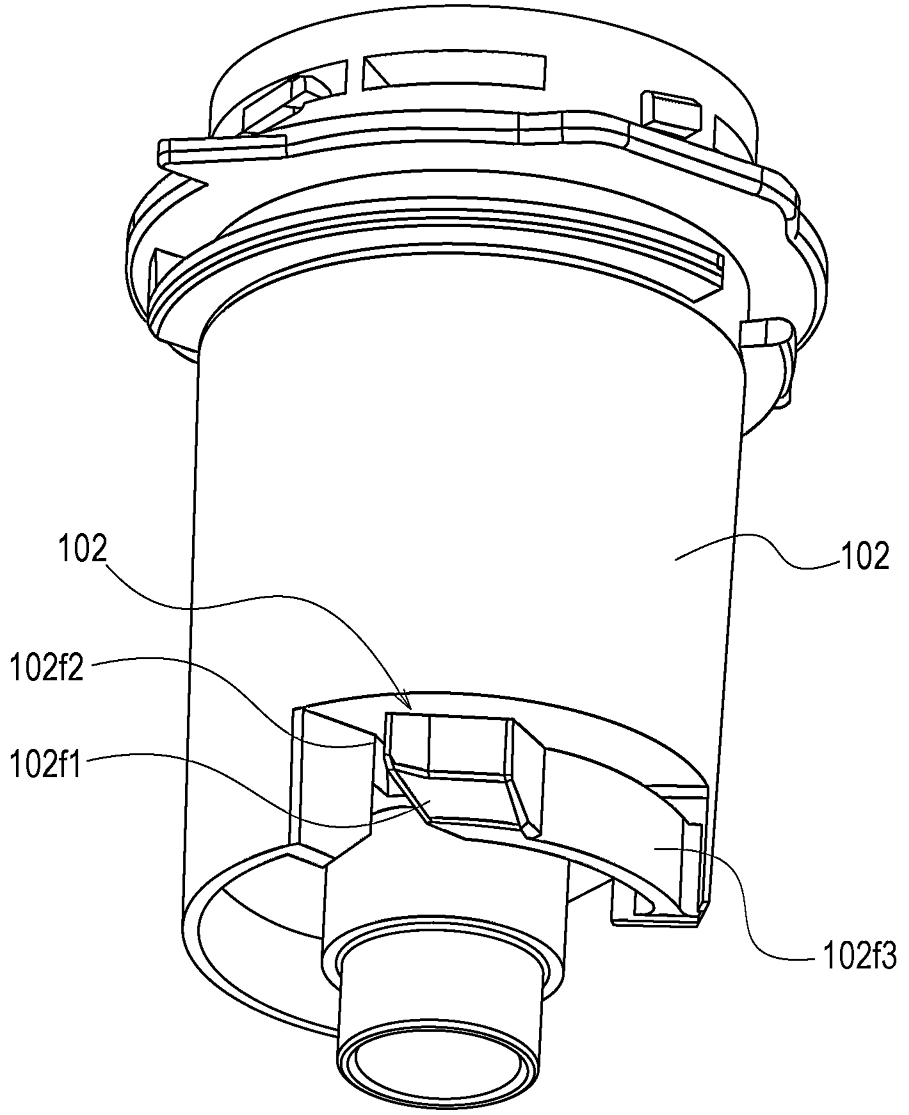
FIG. 11 is a perspective view of a claw portion provided on a nozzle.

As illustrated in FIG. 11, the nozzle 102 of the toner pack 100 includes a claw portion 102*f* serving as a locking mechanism to prevent the pack side shutter 103 from rotating relative to the nozzle 102 at the time of transportation or at the time the user handles the toner pack 100 individually. When the pack side shutter 103 is held in the shielding position by the claw portion 102*f*, the toner contained in the toner pack 100 is prevented from spilling out.

Figure 12A:
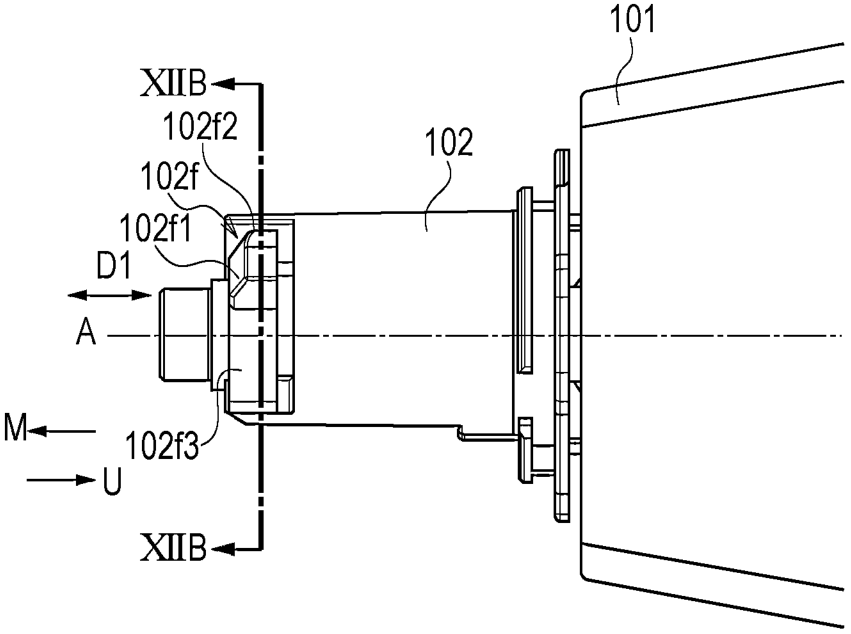
FIG. 12A is a front view of the claw portion.
Figure 12B:
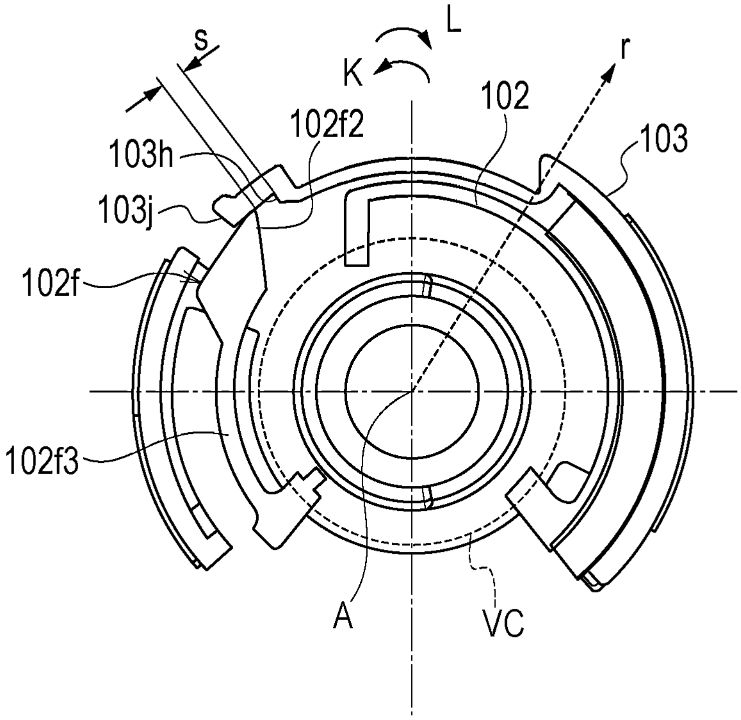
FIG. 12B is a cross-sectional view taken along line XIIB-XIIB of FIG. 12A.
Figure 13A:
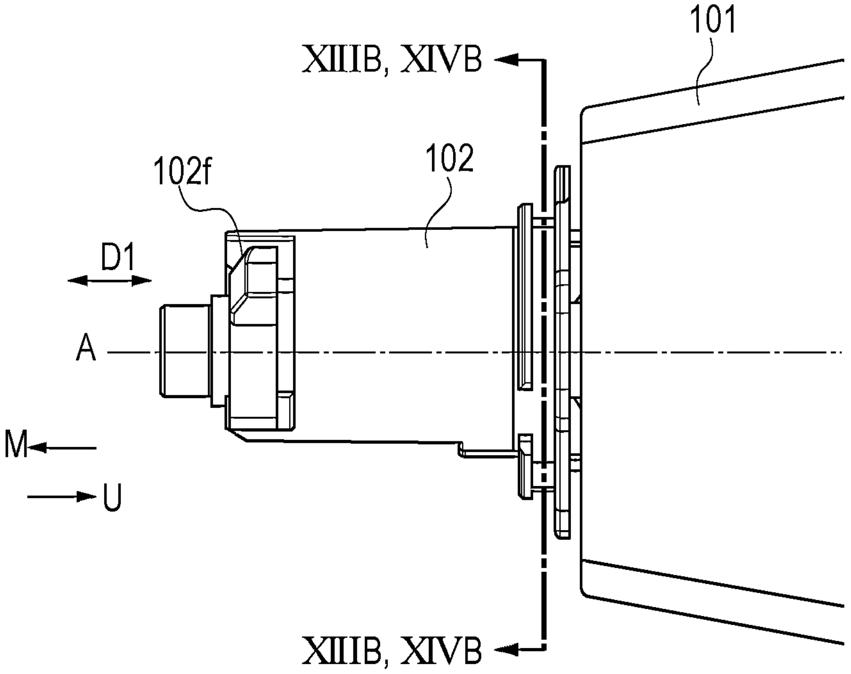
FIG. 13A is a front view of the claw portion.
Figure 13B:
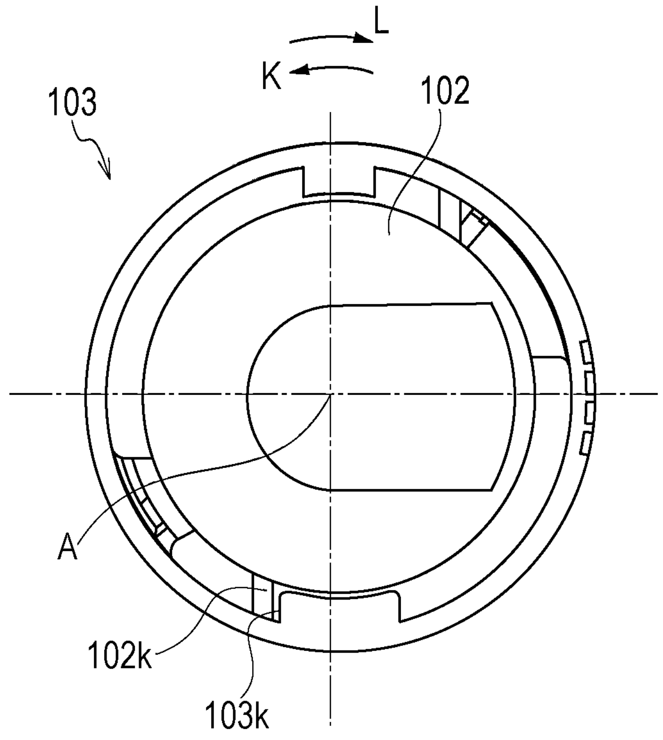
FIG. 13B is a cross-sectional view taken along a line XIIIB-XIIIB, XIVB-XIVB of FIG. 13A.
Figure 14A:
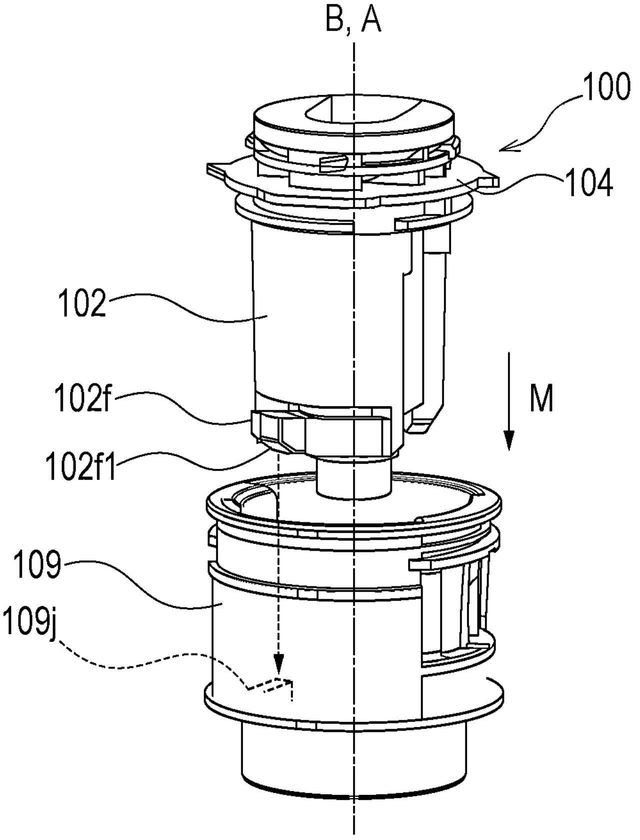
FIG. 14A is a perspective view of how the toner pack is mounted to the apparatus side shutter.
Figure 14B:
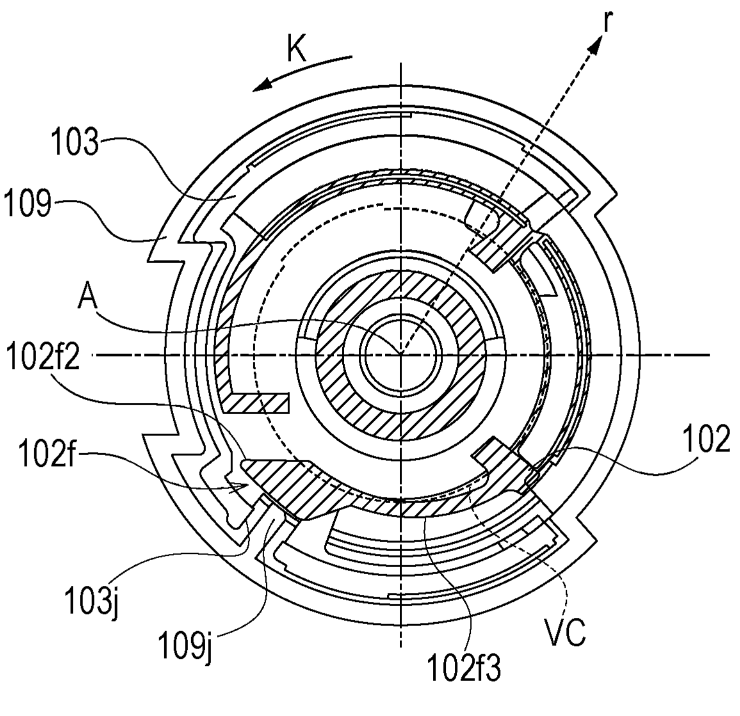
FIG. 14B is a cross-sectional view taken along line XIIIB-XIIIB,XIVB-XIVB of FIG. 13A with the toner pack mounted to the mounting unit.

FIG. 11 is a perspective view of the claw portion 102*f* provided in the nozzle 102. FIG. 12A is a front view illustrating the configuration of a portion including the claw portion 102*f*. FIG. 12B is a cross-sectional view taken along line XIIB-XIIB of FIG. 12A. Like FIG. 12A, FIG. 13A is a front view of the claw portion 102*f*. FIG. 13B is a cross-sectional view taken along line XIIIB-XIIIB of FIG. 13A. FIG. 14A is a perspective view of how the toner pack 100 is mounted to the apparatus side shutter 109. In FIG. 14A, the pouch 101 of toner pack 100 and the pack side shutter 103 are not illustrated, and only the nozzle 102 and the opening member 104 are illustrated. FIG. 14B is a cross-sectional view taken along line XIVB-XIVB of FIG. 13A with the toner pack 100 mounted to the mounting unit 106.

As illustrated in FIGS. 11 to 12B, the claw portion 102*f* serving as a second regulating portion includes an arm portion 102*f*3, a release slope 102*f*1, and a butting portion 102*f*2. The arm portion 102*f*3 is elastically deformed, so that the claw portion 102*f* is movable in the radial direction r of the virtual circle VC centered on the rotational axis A. More specifically, the claw portion 102*f* is movable to a regulating position illustrated in FIG. 12B or a non-regulating position illustrated in FIG. 14B, which is a position on the inner side than the regulating position in the radial direction r.

As illustrated in FIG. 12B, when the claw portion 102*f* is in the regulating position, the butting portion 102*f*2 faces a regulating portion 103*h* of the pack side shutter 103 that is located in the shielding position in the circumferential direction around the rotational axis A. At this time, a gap s is provided between the butting portion 102*f*2 and the regulating portion 103*h*. When the regulating portion 103*h* butts against the butting portion 102*f*2, rotation of the pack side shutter 103 in the direction of arrow K is regulated. The size of the gap s may be set to any value, and a position in the rotational range in which the pack side shutter 103 can rotate within the range of the gap s is considered to be the shielding position. That is, rotation of the pack side shutter 103 from the shielding position in the direction of arrow K is regulated by the claw portion 102*f* located in the regulating position.

When the claw portion 102*f* is in the non-regulating position, the butting portion 102*f*2 is positioned on the inner side than the regulating portion 103*h* of the pack side shutter 103 in the radial direction r of the virtual circle VC centered on the rotational axis A. Thus, the pack side shutter 103 can rotate about the rotational axis A without interfering the butting portion 102*f*2.

As illustrated in FIGS. 6A and 14B, the apparatus side shutter 109 includes a regulation release rib 109*j* extending in the axial direction D1. The regulation release rib 109*j* can be in contact with a release slope 102*f*1 of the claw portion 102*f* when the toner pack 100 is mounted to the mounting unit 106. As illustrated in FIGS. 10A and 14B, the pack side shutter 103 has an opening portion 103*j*. The opening portion 103*j* extends from the end surface (the bottom surface when the toner pack 100 is mounted to the printer body 400) 103*c* to the side surface 103*d* of the pack side shutter 103. The regulation release rib 109*j* provided in the apparatus side shutter 109 can pass through the opening portion 103*j* and is brought into contact with the release slope 102*f*1 of the claw portion 102*f* that is disposed inside of the pack side shutter 103.

The release slope 102*f*1 is inclined to the mounting direction M (the axial direction D1) so as to extend inward in the radial direction r toward the downstream side in the mounting direction M. When the toner pack 100 is mounted to the mounting unit 106, the release slope 102*f*1 changes the direction of the force that the claw portion 102*f* receives from the regulation release rib 109*j* to the inward radial direction r. As a result, the release slope 102*f*1 is pressed by the regulation release rib 109*j* and, thus, the claw portion 102*f* moves inward in the radial direction r from the regulating position to the non-regulating position. That is, when the toner pack 100 is mounted to the mounting unit 106, the claw portion 102*f* is pressed by the mounting unit 106 and, thus, moves from the regulating position to the non-regulating position.

The butting portion 102*f*2 of the claw portion 102*f* described above hits against the regulating portion 103*h* of the pack side shutter 103 and, thus, the rotation of the pack side shutter 103 in the direction of arrow K is regulated. The configuration for regulating the rotation of the pack side shutter 103 in the direction of arrow L, which is opposite to the direction of arrow K, is described below.

As illustrated in FIG. 13B, the pack side shutter 103 includes a rotation regulating rib 103*k*, and the nozzle 102 has a rotation regulating surface 102*k* serving as a first regulating portion facing the rotation regulating rib 103*k* in the circumferential direction around the rotational axis A. When the pack side shutter 103 is in the shielding position, the rotation regulating rib 103*k* faces the rotation regulating surface 102*k* with a small gap therebetween. When the pack side shutter 103 in the shielding position is about to rotate in the direction of arrow L, the rotation regulating rib 103*k* hits against the rotation regulating surface 102*k* and, thus, the rotation of the pack side shutter 103 in the direction of arrow L is regulated.

As illustrated in FIGS. 13A and 13B, the claw portion 102*f* is disposed more downstream in the mounting direction M than the rotation regulating surface 102*k* and the rotation regulating rib 103*k*. This is because the claw portion 102*f* is disposed at a corresponding position in the mounting direction M where the claw portion 102*f* is easily pressed by the regulation release rib 109*j* of the apparatus side shutter 109 when the toner pack 100 is mounted to the mounting unit 106. This enables reduction in the size of the opening portion 103*j* provided in the pack side shutter 103, ensuring the rigidity of the pack side shutter 103 and inhibiting access to the claw portion 102*f* by the user. The arrangement of the claw portion 102*f*, the rotation regulating surface 102*k*, and the rotation regulating rib 103*k* is not limited thereto and may be changed in any way.

As described above, when the toner pack 100 is not mounted to the mounting unit 106, rotation of the pack side shutter 103 in the directions of arrow K and arrow L is regulated and, thus, the pack side shutter 103 is easily held in the shielding position. When the toner pack 100 is mounted to the mounting unit 106 and then the pack side shutter 103 is rotated in the direction of arrow K with the claw portion 102*f* being in the non-regulating position, the pack side shutter 103 exposes the discharge port 102*a* of the nozzle 102, as illustrated in FIG. 9B.

As illustrated in FIG. 8B and FIGS. 10A and 10B, the pack side shutter 103 includes three radial positioning portions 103*f*. The radial positioning portions 103*f* protrude outward in the radial direction r from the side surface 103*d*. Each of the radial positioning portions 103*f* is located upstream of the pack side shutter 103 in the mounting direction M.

Film

Figure 15A:
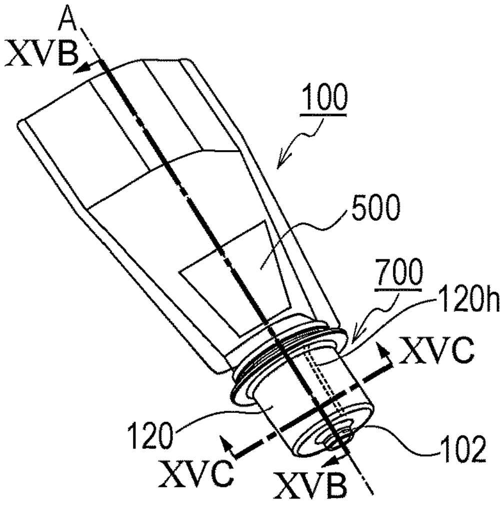
FIG. 15A is a perspective view of the toner pack with a film attached thereto.
Figure 15B:
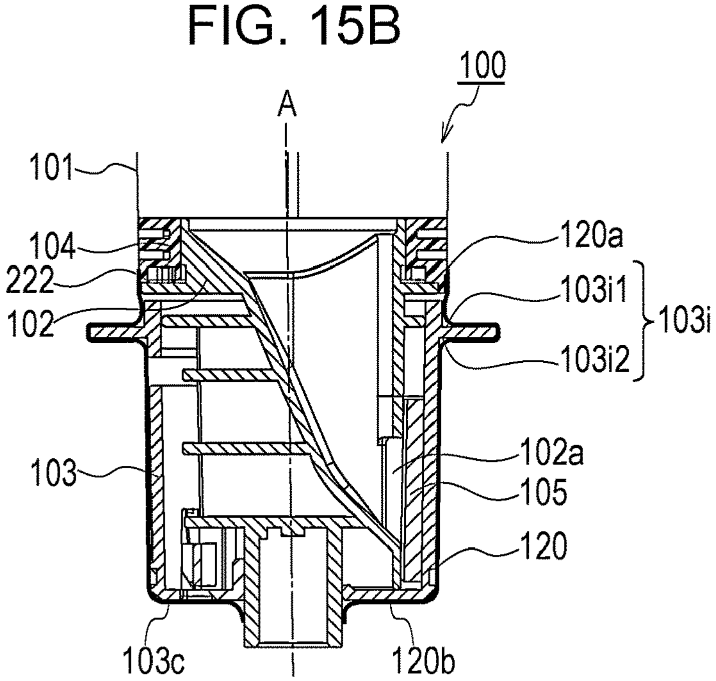
FIGS. 15B and 15C are cross-sectional views of the toner pack.
Figure 15C:
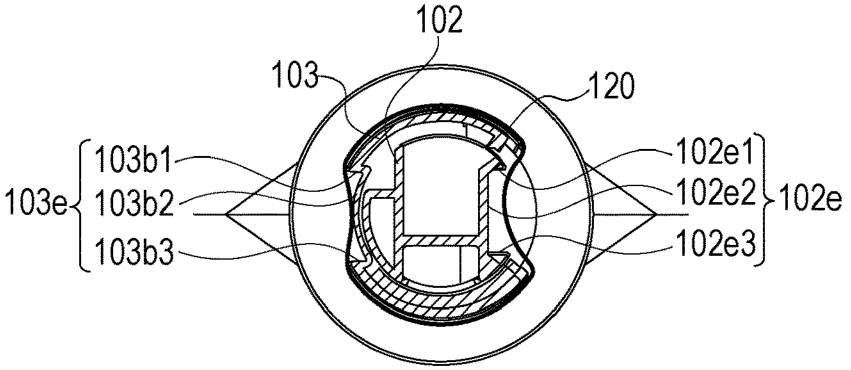
Figure 16A:
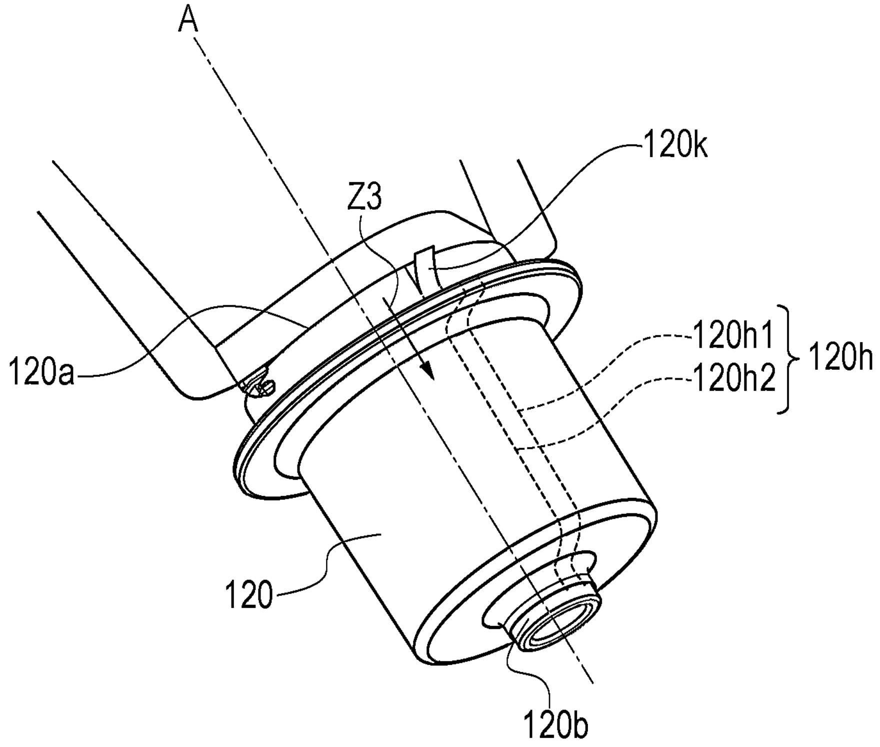
FIG. 16A is a perspective view of a breakable portion of the film.
Figure 16B:
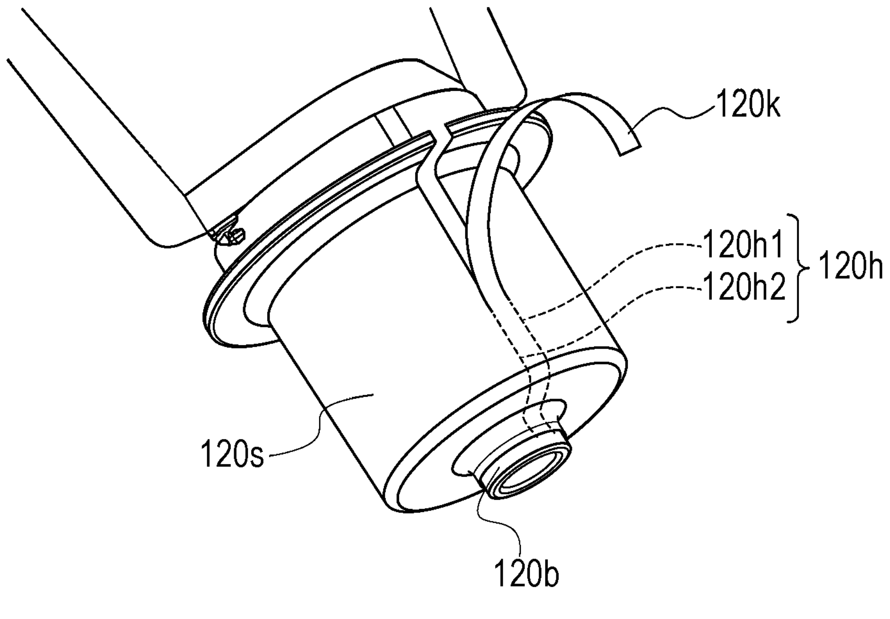
FIG. 16B is a perspective view of the process of removing the film.

The film 120 attached to the toner pack 100 is described below with reference to FIGS. 15A to 17C. FIG. 15A is a perspective view of the toner pack 100 with the film 120 attached. FIGS. 15B and 15C are cross-sectional views of the toner pack 100 with the film 120 attached. FIGS. 16A and 16B are perspective views of the film 120 that is being removed from the toner pack 100.

As illustrated in FIG. 15A, the film 120 is provided to cover at least part of the mounted unit 700. The film 120 is a sheet member made of resin with a thickness of less than or equal to 0.30 mm. It is desirable that the thickness be at least 0.01 mm. That is, the thickness of the film 120 is set to greater than or equal to 0.01 mm and less than or equal to 0.30 mm. The thickness is set to a sufficient value so that the film 120 is not torn by an external force applied during transportation. As illustrated in FIG. 15B, the film 120 is attached so as to closely conform to the outer surface shapes of the nozzle 102, the pack side shutter 103, and the opening member 104. Furthermore, the film 120 is in tight contact with a surface 103*i*1 of the flange 103*i* of the pack side shutter 103 and the end surface 103*c* of the pack side shutter 103. Since the film is attached closely to the surface 103*i*1 and the end surface 103*c*, the film 120 is fixed to the mounted unit 700 in the direction of the rotational axis A without coming off from the mounted unit 700 of the toner pack 100. The outer diameter of the flange 103*i* is larger than the diameters of the other surfaces of the pack side shutter 103, and the flange 103*i* is located closer to the storage portion.

As illustrated in FIG. 15C, the film 120 is formed to be concave toward the surfaces 102*e*1, 102*e*2, and 102*e*3 that form the recess 102*e* of the nozzle 102. Thus, depending on the shape and size of the recess 102*e* of the nozzle 102, the film 120 is not in completely tight contact with the surface of the nozzle 102. In addition, the film 120 is formed along the surfaces 103*b*1, 103*b*2, and 103*b*3 that constitute the driven transmission portion 103*e* of the pack side shutter 103. This is because when being attached, the film 120 shrinks along the outer shape of the nozzle 102. As a result, since the concave portion is provided, the film 120 is fixed without slipping in the rotation direction about the rotational axis A. Thus, the film 120 covers the mounted unit 700 that is mounted to the mounting unit 106 (refer to FIGS. 18A and 18B) of the printer body 400, preventing the mounted unit 700 from being scratched or damaged by an external force received during transportation or user handling. Thus, the product is protected. The toner pack 100 is sold individually and is mounted to the printer body 400 by a user who purchased the toner pack 100 or by a maintenance technician. Then, the toner pack 100 is used to supply toner to the printer body. That is, an undamaged film 120 that covers the toner pack 100 proves that the toner pack 100 is unopened and unused. A region covered by the film 120 in the direction of the rotational axis A is described below with reference to FIG. 15B. Toner is supplied into the printer body 400 by a user who compresses and flattens the pouch 101 of the toner pack 100 attached to the printer body 400 by, for example, their hand. At this time, if the pouch 101 that contains toner also contains more than a certain amount of air, the toner is smoothly discharged together with the air inside to the outside of the toner pack 100 via the discharge port 102*a*. That is, it is desirable that a certain amount of air be sealed in the pouch 101 together with the toner.

In FIG. 15B, an end of the film 120 adjacent to the pouch 101 in the direction of the rotational axis A is defined as one end 120*a*, and the end opposite the one end 120*a* is defined as the other end 120*b*. One end 120*a* extends up to the position where the film 120 covers a joint portion 222 of the nozzle 102 and the opening member 104. The other end 120*b* extends up to the position where the film 120 covers the pack side seal 105 that shields the discharge port 102*a* of the nozzle 102. This prevents leakage even when an unexpected external force that compresses the pouch is exerted on the toner pack 100 during transportation of the toner pack 100 or during use by the user. That is, the film 120 is configured to be in tight contact with and cover the joint portion 222 of the nozzle 102 and the opening member 104 and the discharge port 102*a* of the nozzle 102. This configuration prevents further air leakage from the toner pack 100. In addition, the air inside the pouch 101 expands when the outside air pressure decreases at high altitudes. In this case, the configuration is such that toner leakage does not occur, and the air is properly expelled. Toner leakage due to a change in external atmospheric pressure does not occur, but the air is appropriately expelled. Thus, the configuration prevents damage of the pouch 101 due to the effect of the atmospheric pressure and leakage of the toner.

How to remove the film 120 is described below with reference to FIGS. 16A and 16B. As illustrated in FIG. 16A, the film 120 has a breakable portion 120*h*. The breakable portion 120*h* is formed by laser processing. Perforation, half-cutting, or drilling is suitably used as the laser processing. The breakable portion 120*h* is a break line provided as intermittent tiny cuts made on the surface of the film 120 in substantially the direction of the rotational axis A along the shape of the mounted unit 700. Two break lines 120*h*1 and 120*h*2 are provided, and the break lines 120*h*1 and 120*h*2 extend from one end 120*a* to the other end 120*b* of the film 120. At one end 120*a*, the breakable portion 120*h* has a release portion 120*k* that is a cut in the film 120. In the release portion 120*k*, the break lines 120*h*1 and 120*h*2 are continuous cut lines extending from the one end 120*a*, so that the user can easily pinch the release portion 120*k* to take off the film. By pinching the release portion 120*k* and pulling it in the direction toward the other end 120*b* (a direction of arrow Z3), the film 120 is cut along the two break lines 120*h*1 and 120*h*2 as illustrated in FIG. 16B. Thus, the film 120 that is annular separates into two portions, that is, the breakable portion 120*h* and a main portion 120*s*. As described above, the film 120 is removed from the toner pack. This configuration enables the user to easily remove the main portion 120*s* of the film. The breakage shape is not limited thereto. There need only be at least two break lines, and three or more break lines may be provided. For example, instead of providing the breakage shape with intermittent incisions as described above, cuts that do not penetrate the film 120 may be provided along the break lines 120*h*1 and 120*h*2, although the thickness of only the break line portions is reduced.

Figure 17A:
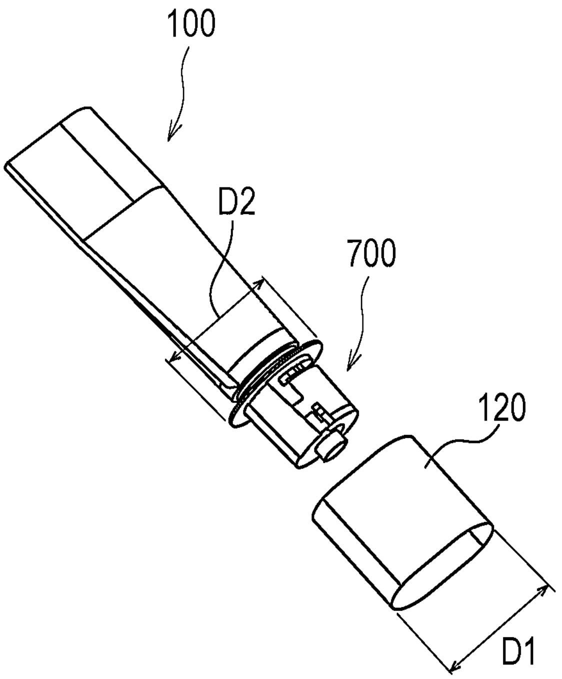
FIG. 17A is a perspective view of the film before being attached.
Figure 17B:
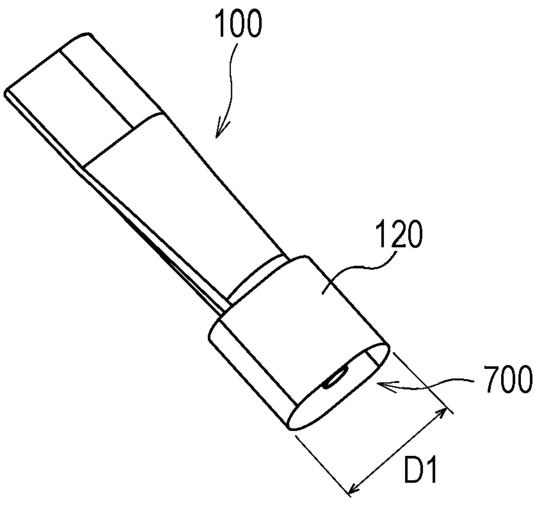
FIG. 17B is a perspective view of the process of attaching the film.

A method for attaching the film 120 is described below with reference to FIGS. 17A and 17B. As illustrated in FIG. 17A, the film 120 that is unattached has a substantially cylindrical shape. At this time, the inner diameter D1 of the substantial cylinder is greater than an outermost diameter D2 of the mounted unit 700. As illustrated in FIG. 17B, the film 120 is put over the mounted unit 700 to cover the mounted unit 700. Then, heat is applied externally to the film 120. The heat causes the film 120 to shrink so that the inner diameter D1 is reduced, and the film 120 is attached along the outer shape of the mounted unit 700 as described above. It is desirable that the film 120 be a so-called shrink film that has been stretched at the time of film production, and when heat is applied, the internal stress is relaxed and, thus, the film returns to the dimensions before the stretching process. According to the present embodiment, a film with the property of shrinking when heat is applied due to the stretching process is used. However, the film is not limited thereto. Any film that has a shrinking property may be used as appropriate. In general, one of polyvinyl chloride, polypropylene, polyethylene, polystyrene, polyolefin, polyethylene terephthalate, and other materials having heat-shrinkable property can be appropriately selected as the material of the film. To apply heat, a dryer method may be employed in which a dryer is installed in the manufacturing process at a position where heated air is applied to the film, and the film is shrunk by the heated air from the dryer. Alternatively, a conveyor method may be employed in which the toner pack and film are placed on a conveyor that passes through a high-temperature area for a predetermined time, and the film is shrunk by the heat received in the high-temperature area. As described above, a method for applying heat may be selected as appropriate.

Figure 24A:
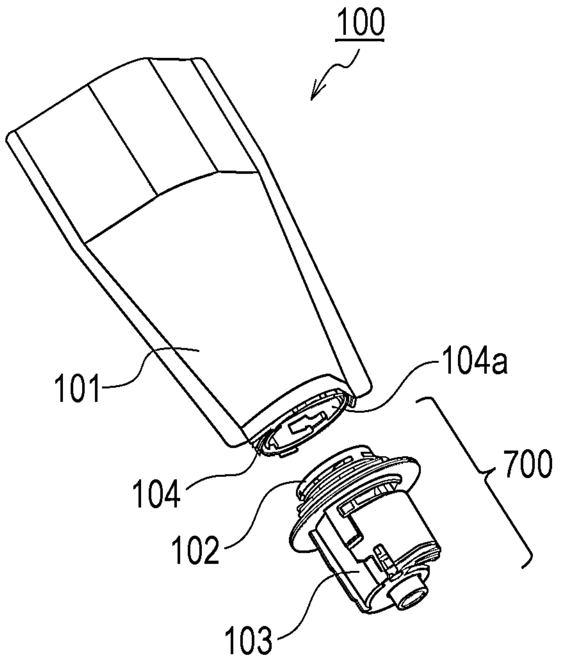
FIGS. 24A and 24B are perspective views illustrating a method for manufacturing the toner pack in which a front end portion is covered with a film and then is joined to a storage portion.
Figure 24B:
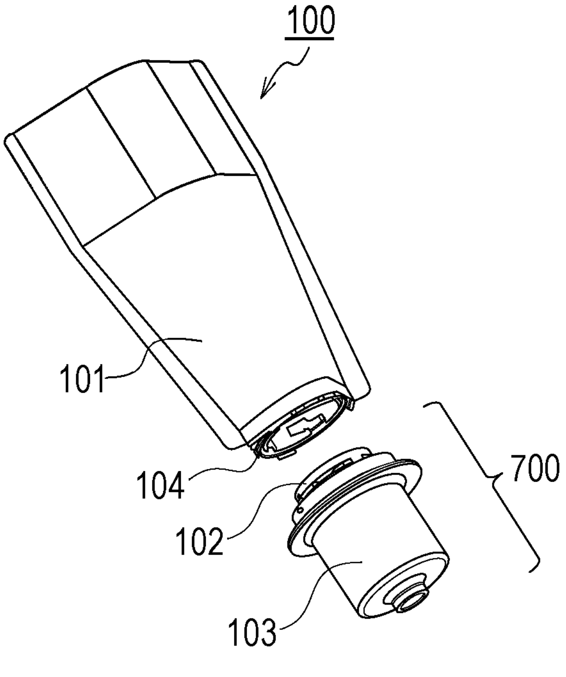

When the film 120 is a shrink film and heat is applied to shrink the film 120, it is desirable to apply minimized amount of heat to the toner contained in the toner pack 100. This is to prevent deformation and agglomeration of the toner due to heat and, thus, stabilize image quality. As a method for manufacturing a toner pack without applying heat, as illustrated in FIG. 24A, the pouch 101 having the opening member 104 joined thereto is assembled in a process different from that for the mounted unit 700 (mainly constituted by the nozzle 102 and the pack side shutter 103). Thereafter, the amount of toner is supplied through the through-hole 104*a* of the pouch 101 having the opening member 104 joined thereto. Then, as illustrated in FIG. 24B, the shrink film 120, which is shrunk individually without the pouch 101, is attached to the mounted unit 700. In a subsequent process, the pouch 101 filled with toner and the mounted unit 700 wound around with the shrink film 120 are assembled together. More specifically, the opening member 104 joined to the pouch 101 and the nozzle 102 of the mounted unit 700 are joined together. By using such an assembly method, the toner pack 100 can be assembled without applying the heat for shrinking the film 120 to the pouch 101 filled with toner. To shrink the film 120, heat of 80° C. to 150° C. can be applied, depending on the film material. However, since the heat is applied to the film 120 without the pouch, the influence of heat on toner deformation or agglomeration is eliminated.

A process of attaching the film 120 may be used in which a heat applying time is reduced, and the film shrinking time is controlled so that the heat is not transferred to the toner. By using the process, the pouch 101 and the mounted unit 700 can be covered with the shrink film 120 after being assembled together.

That is, after the pouch 101 is filled with toner, the mounted unit 700 is joined to the pouch 101 and then is covered with the shrink film 120 by heat. At this time, the pouch 101 is disposed on the lower side in the direction of gravitational force, and the mounted unit 700 is disposed on the upper side in the direction of gravitational force. Then, the film 120 that is heat-shrinkable may be attached by heating a portion of the toner pack 100 adjacent to the mounted unit 700, that is, the upper portion in the direction of gravitational force. In such a manufacturing process, when the shrink film 120 is attached, the pouch 101 is disposed on the lower side, and the toner falls down to the side with the pouch 101 by the gravitational force. Therefore, when the mounted unit 700 on the upper side is heated to attach the shrink film 120, the risk of deformation or agglomeration of the toner can be reduced.

Figure 26:
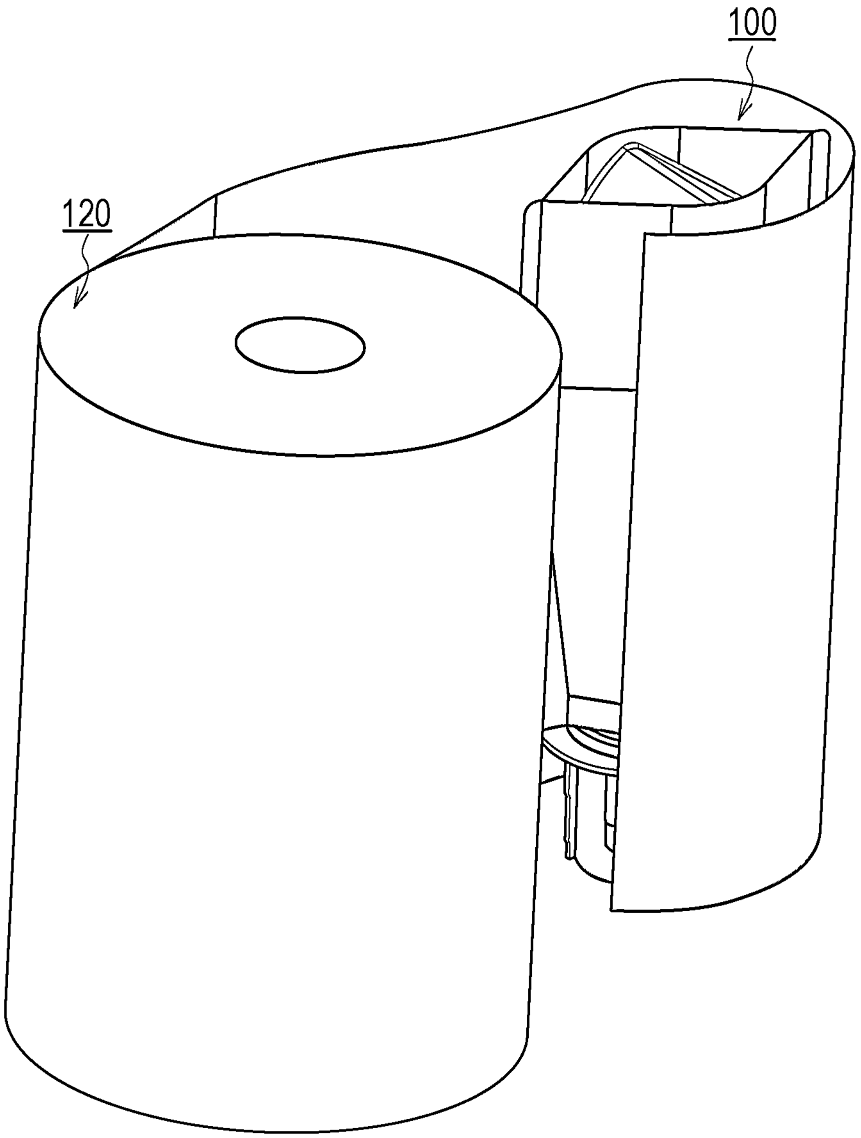
FIG. 26 is a perspective view illustrating a method for manufacturing the toner pack in which the toner pack is covered with a stretch film.

Instead of the above-described configuration in which heat is applied to shrink the film 120 so that the film 120 is in tight contact with the toner pack 100, a configuration may be employed in which, as illustrated in FIG. 26, a stretchable sheet-like stretch film 120 made of, for example, polyethylene is tightly wound around the toner pack 100. Using the stretch film 120 makes it possible to assemble the toner pack 100 without deforming or agglomerating the toner due to heat, since heat is not used.

As illustrated in FIG. 15A, when the toner pack 100 is mounted to the image forming apparatus to supply toner, the instructions 500 are printed on one side of the pouch to provide information to the user on how to supply toner and precautions for its operation. The breakable portion 120*h* is provided on the same side as the instructions 500. In this way, a user (or a maintenance technician) who is about to open the pouch by pinching and taking off the breakable portion 120*h* easily notice that the instructions 500 are on the same side as the breakable portion 120*h* when opening the pouch. A user who saw the instructions 500 first easily notice the presence of the breakable portion 120*h*. For this reason, the user can easily perform the toner supply operation in accordance with the instructions 500, which prevents operation errors in advance.

Instead of a shrink film to which heat is applied, a stretch film made of, for example, polyethylene may be wound around the mounted unit 700 so as to be in tight contact with the mounted unit 700. According to the configuration, the same effect can be achieved by employing a configuration in which the end portion of the stretch film is located on the surface having the instructions 500 printed thereon.

It has been described above that the presence of the film 120 can protect the toner pack 100. Furthermore, it is possible to cover only a limited area as desired, as compared with a configuration including a cap that covers the entire mounted unit 700 for protection. This is because the configuration according to the present embodiment including the film 120 allows the film 120 to shrink and to be attached along even a complex shape. In addition, the film 120 is thinner and smaller than the cap that covers and protects the entire mounted unit 700, enabling packaging using less resin and reducing the amount of waste after opening the package. As a result, environmental burdens can be reduced. Furthermore, there is no need to provide a special shape for fixing the cap, and the size of the toner pack can be reduced. In this way, it is possible to easily protect the mounted unit 700 along the shape of the mounted unit 700 for the image forming apparatus. Furthermore, there is no need to separately prepare a protective member that follows the shape of the mounted unit 700, and a highly flexible design of the mounted unit 700 in accordance with mounting to the image forming apparatus is available without considering a protective member. Still furthermore, the reduced volume per toner pack also improves the logistics efficiency when transporting toner packs from the factory to dealers.

Mounting of Toner Pack to Mounting Unit

Figure 18A:
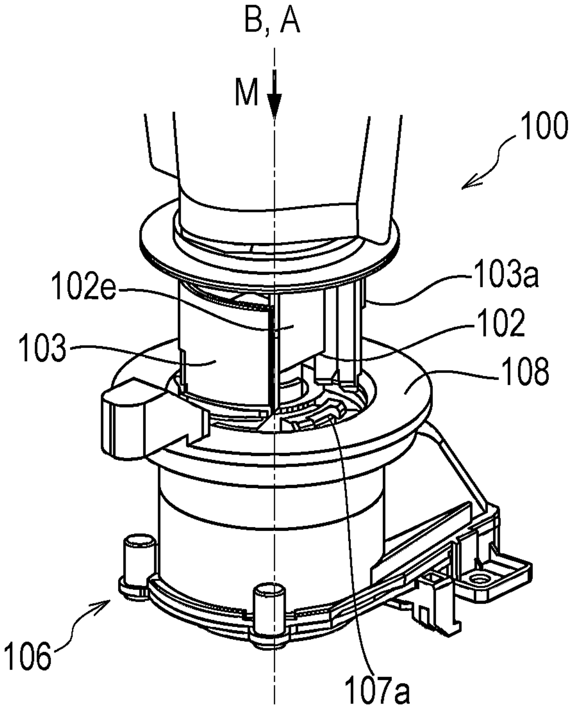
FIG. 18A is a perspective view of the toner pack being mounted to the mounting unit.
Figure 18B:
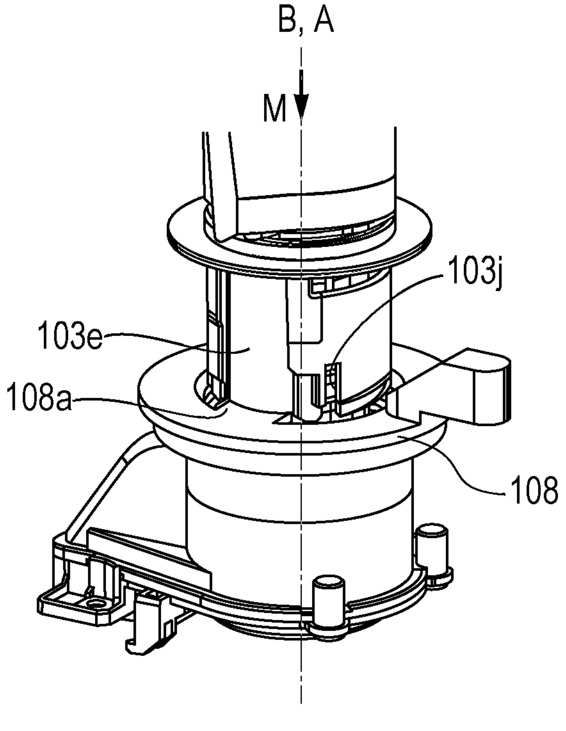
FIG. 18B is a perspective view of the toner pack being mounted to the mounting unit as viewed from another angle.
Figure 19A:
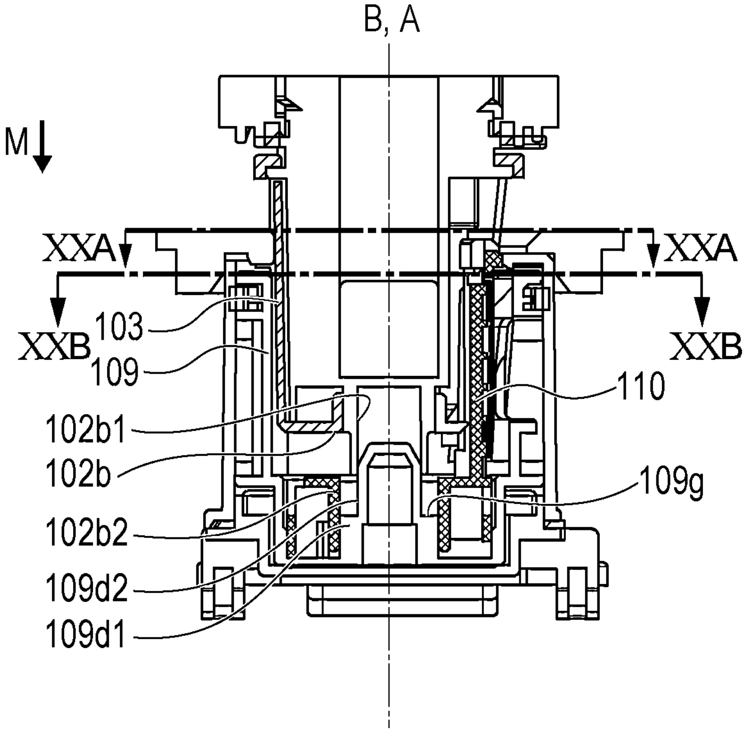
FIG. 19A is a cross-sectional view of the toner pack being mounted to the mounting unit.
Figure 19B:
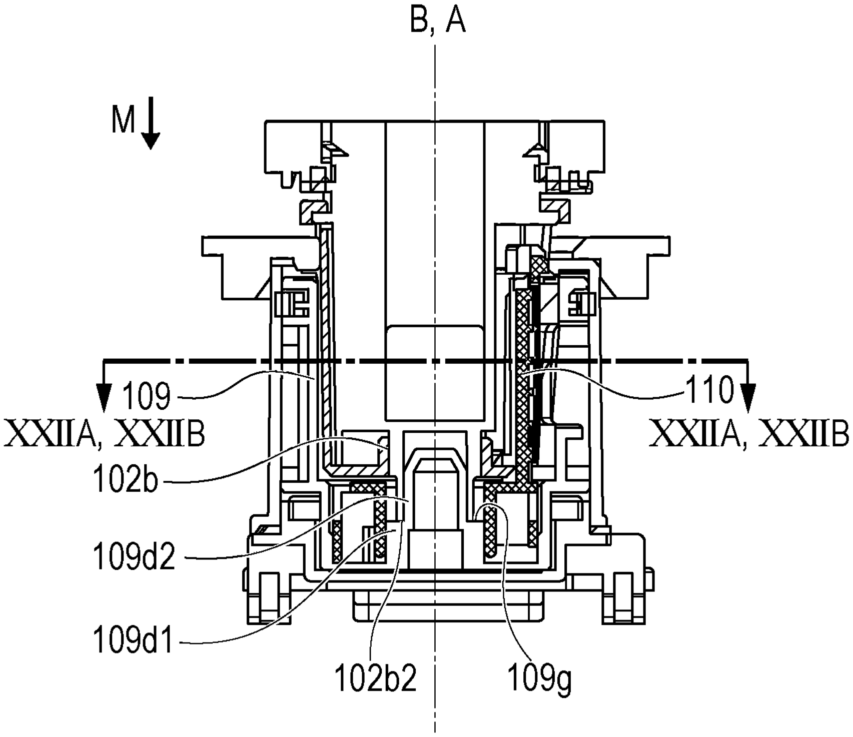
FIG. 19B is a cross-sectional view of the toner pack after the toner pack is mounted to the mounting unit.

The state of the system when a user or a maintenance technician mounts the toner pack 100 to the mounting unit 106 of the printer body 400 is described below with reference to FIGS. 18A to 20B. FIGS. 18A and 18B are perspective views of the toner pack 100 being mounted to the mounting unit 106. FIG. 19A is a cross-sectional view of the toner pack 100 being mounted toward the mounting unit 106. FIG. 19B is a cross-sectional view of the toner pack 100 that has been mounted to the mounting unit 106.

Figure 20A:
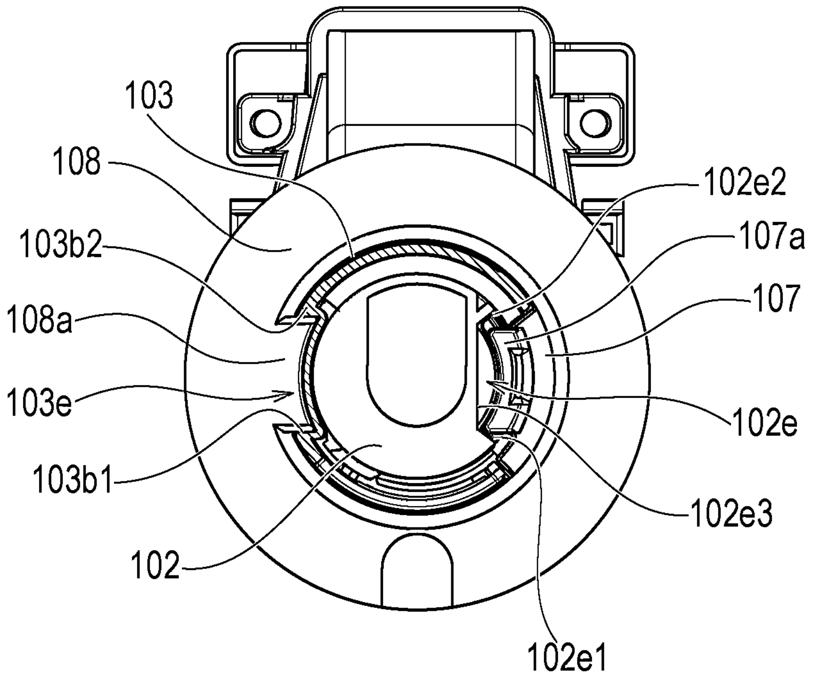
FIG. 20A is a cross-sectional view taken along line XXA-XXA of FIG. 19A.
Figure 20B:
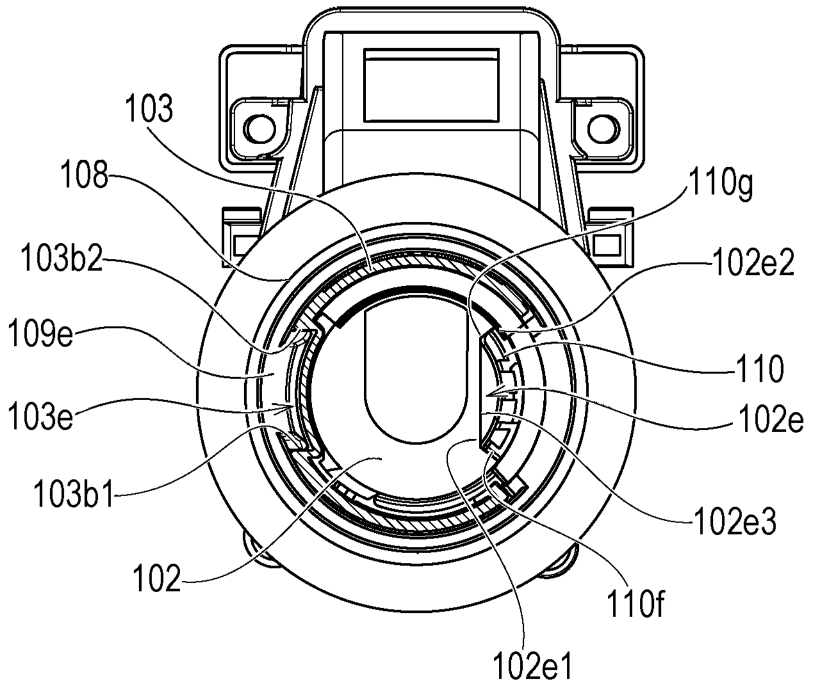
FIG. 20B is a cross-sectional view taken along line XXB-XXB of FIG. 19A.

FIG. 20A is a cross-sectional view taken along line XXA-XXA of FIG. 19A. FIG. 20B is a cross-sectional view taken along line XXB-XXB of FIG. 19A. In FIGS. 19A to 20B, the cut surfaces of the pack side shutter 103 and the cover 110 are hatched.

When the toner pack 100 is mounted to the mounting unit 106, the film 120 is removed. This operation exposes the driven transmission portion 103*e*, the protruding portion 102*b*, and the positioned portion 102*d* (refer to FIGS. 10A and 10B) of the mounted unit 700. The mounted unit 700 of the toner pack 100 can be mounted to the mounting unit 106 of the image forming apparatus 1 with the film 120 removed.

As illustrated in FIGS. 18A and 18B, the user then moves the toner pack 100 with the pack side shutter 103 in the shielding position in the mounting direction M toward the mounting unit 106 with the apparatus side shutter 109 in the shielding position and mounts the toner pack 100. At this time, the user aligns the recess 102*e* of the nozzle 102 and the opening 103*a* of the pack side shutter 103 with the positioning portion 107*a* of the first frame 107. Simultaneously, the user also aligns the driven transmission portion 103*e* of the pack side shutter 103 with the drive transmission portion 108*a* of the control lever 108.

After the above-described alignment of the toner pack 100 with the mounting unit 106, the user moves the toner pack 100 in the mounting direction M and mounts the toner pack 100 to the mounting unit 106. At this time, as illustrated in FIG. 19A, a small diameter portion 109*d*2 of the center boss 109*d* of the apparatus side shutter 109 is fitted to the inner peripheral surface 102*b*1 of the protruding portion 102*b* of the nozzle 102. This operation allows the position of the nozzle 102 in the radial direction r relative to the apparatus side shutter 109 to be determined with high precision.

At this time, as illustrated in FIG. 20A, the drive transmission portion 108*a* of the control lever 108 and the driven transmission portion 103*e* of the pack side shutter 103 are engaged with each other. Simultaneously, as illustrated in FIG. 20B, a side surface 110*f* and a side surface 110*g* of the cover 110 move closer to or are engaged with a surface 102*e*1 and a surface 102*e*2 that form the recess 102*e* of the nozzle 102. As illustrated in FIGS. 24A and 24B, the driven transmission portion 103*e* of the pack side shutter 103 is engaged with the driven transmission portion 109*e* of the apparatus side shutter 109 and the drive transmission portion 108*a* of the control lever 108.

Since the surfaces 102*e*1 and 102*e*2 of the recess 102*e* of the nozzle 102 are engaged with the side surfaces 110*f* and 110*g* of the cover 110, respectively, the nozzle 102 of the toner pack 100 does not rotate relative to the body base 2 including the cover 110. That is, when the toner pack 100 is mounted to the image forming apparatus 1, the recess 102*e* is engaged with the cover 110 of the image forming apparatus 1, thus regulating the rotation of the nozzle 102 relative to the image forming apparatus 1. The control lever 108, the pack side shutter 103, and the apparatus side shutter 109 can rotate as a substantially single unit about the rotational axis B relative to the body base 2 and the nozzle 102.

More specifically, when the control lever 108 is rotated, the drive transmission portion 108*a* of the control lever 108 presses against the surface 103*b*1 or 103*b*2 of the pack side shutter 103, causing the pack side shutter 103 to rotate. Thereafter, the surface 103*b*1 or 103*b*2 that constitute the driven transmission portion 103*e* of the pack side shutter 103 presses against the driven transmission portion 109*e* of the apparatus side shutter 109, causing the apparatus side shutter 109 to rotate.

After the toner pack 100 is mounted to the mounting unit 106, the three radial positioning portions 103*f* of the pack side shutter 103 (refer to FIGS. 8B, 10A, and 10B) are in contact with the inner peripheral surface 109*h* of the apparatus side shutter 109 (refer to FIG. 6A). This determines the position of the toner pack 100 in the radial direction r on the upstream side in the mounting direction M.

As illustrated in FIG. 19B, the position of the toner pack 100 in the mounting direction M is determined when the protruding-portion end surface 102*b*2 of the protruding portion 102*b* of the nozzle 102 hits against the pack contact surface 109*g* of the apparatus side shutter 109. For positioning the protruding portion 102*b* of the nozzle 102, a configuration in which the outer peripheral surface of the protruding portion 102*b* is fitted to the cylindrical portion 110*j* of the cover 110 (refer to FIGS. 6A and 6B) may be employed.

The positioned portion 102*d* provided on the nozzle 102 is engaged with the positioning portion 107*a* of the first frame 107. As a result, the nozzle 102 of the toner pack 100 is restricted from rotating relative to the first frame 107 (the body base 2).

As illustrated in FIGS. 14A and 14B, when the toner pack 100 is mounted to the mounting unit 106, the claw portion 102*f* provided on the nozzle 102 moves from the regulating position to the non-regulating position (the position illustrated in FIG. 14B), as described above. More precisely, the release slope 102*f*1 is pressed by the regulation release rib 109*j* and, thus, the claw portion 102*f* moves inward in the radial direction r from the regulating position to the non-regulating position. As a result, the rotation restriction of the pack side shutter 103 in the direction of arrow K is released.

Operation of Control Lever

Figure 21A:
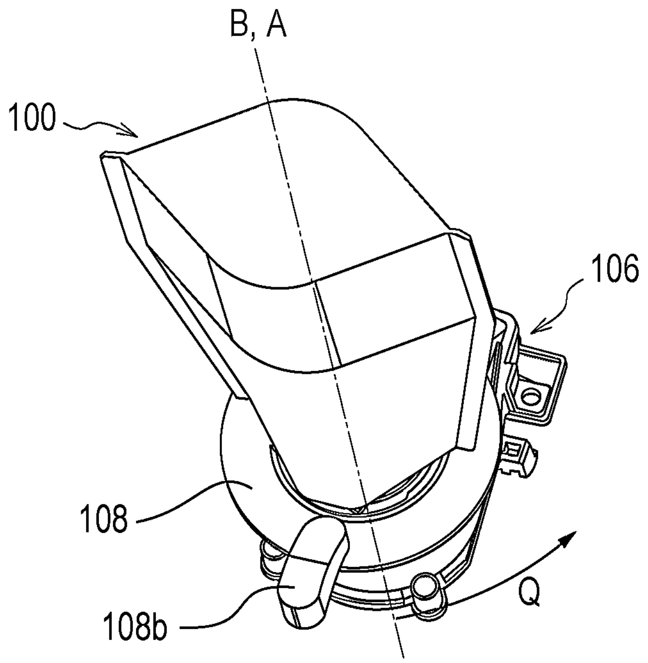
FIG. 21A is a perspective view of the control lever and the toner pack in the closed position.
Figure 21B:
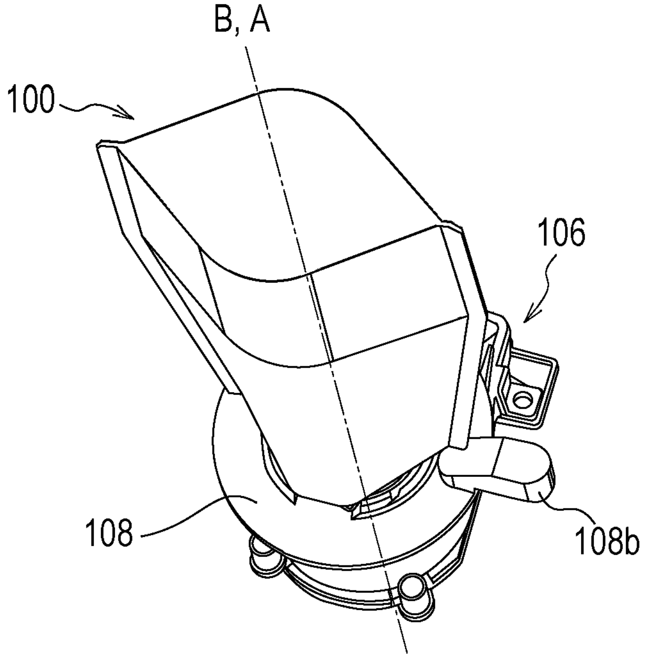
FIG. 21B is a perspective view of the control lever and the toner pack in the open position.
Figure 22A:
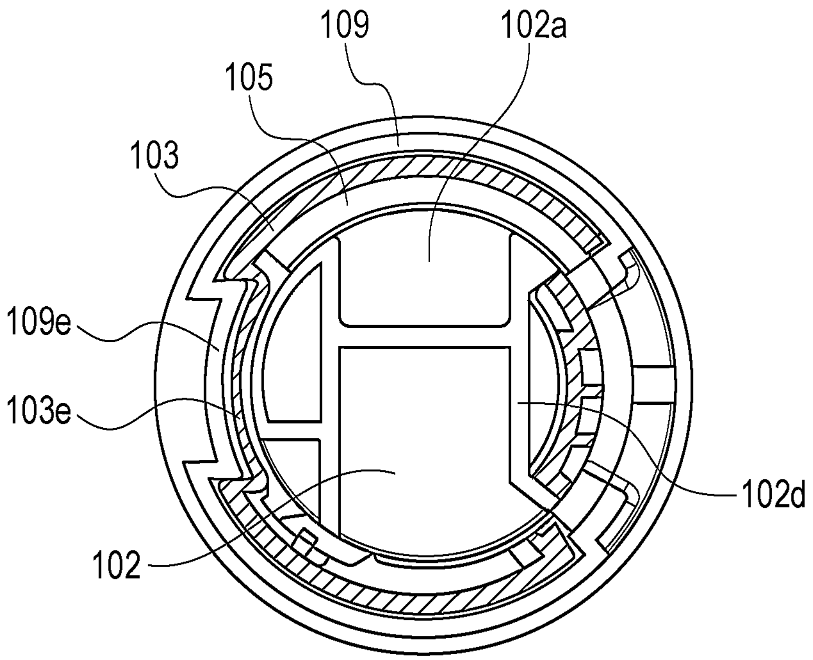
FIG. 22A is a cross-sectional view taken along a line XXIIA-XXIIA,XXIIB-XXIIB of FIG. 19B when both the apparatus side shutter and the pack side shutter are in the shielding position.
Figure 22B:
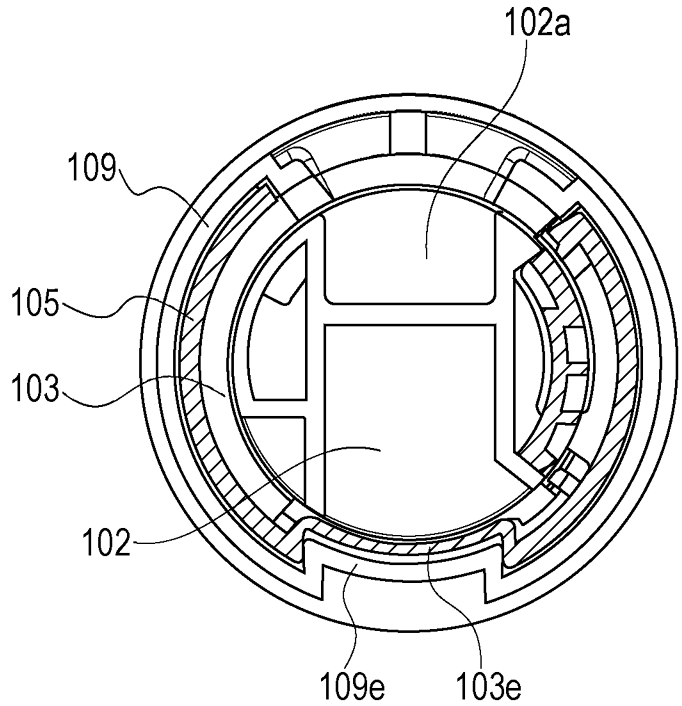
FIG. 22B is a cross-sectional view taken along line XXIIA-XXIIA,XXIIB-XXIIB of FIG. 19B when both the apparatus side shutter and the pack side shutter are in the open position.

FIG. 21A is a perspective view of the control lever 108 that is in the closed position and the toner pack 100. FIG. 21B is a perspective view of the control lever 108 that are in the open position and the toner pack 100. FIG. 22A is a cross-sectional view taken along line XXIIA-XXIIA of FIG. 19B when both the apparatus side shutter 109 and the pack side shutter 103 are in the shielding position. FIG. 22B is a cross-sectional view taken along line XXIIB-XXIIB of FIG. 19B when both the apparatus side shutter 109 and the pack side shutter 103 are in the open position.

As described above, when the toner pack 100 is mounted to the mounting unit 106, the control lever 108, the pack side shutter 103, and the apparatus side shutter 109 can rotate integrally about the rotational axis B relative to the body base 2 and the nozzle 102. When the toner pack 100 is mounted to the mounting unit 106 and the control lever 108 is in the closed position, the discharge port 102*a* is shielded by the pack side shutter 103, the pack side seal 105, and the apparatus side shutter 109, as illustrated in FIG. 22A. For this reason, the toner in pouch 101 cannot reach the apparatus side opening 117*a* of the second frame 117.

As illustrated in FIGS. 21A and 21B, when the toner pack 100 mounted in the mounting unit 106 and the control lever 108 is rotated from the closed position to the open position in the direction of arrow Q, the pack side shutter 103 and the apparatus side shutter 109 rotate from the shielding position to the open position.

More specifically, the drive transmission portion 108*a* of the control lever 108 presses against the surface 103*b*1 of the pack side shutter 103. As a result, the pack side shutter 103 is rotated from the shielding position to the open position together with the control lever 108. That is, the pack side shutter 103 rotates from the shielding position to the open position in conjunction with the rotation of the control lever 108 due to the engagement of the drive transmission portion 108*a* with the surface 103*b*1. The surface 103*b*2 of the pack side shutter 103, which is rotated from the shielding position to the open position, presses against the driven transmission portion 109*e* of the apparatus side shutter 109. As a result, the apparatus side shutter 109 is rotated from the shielding position to the open position together with the pack side shutter 103. That is, the apparatus side shutter 109 rotates integrally with the pack side shutter 103 in conjunction with the rotation of the control lever 108 due to the engagement of the surface 103*b*2 with the driven transmission portion 109*e*.

Then, as illustrated in FIG. 22B, the pack side shutter 103, the pack side seal 105, and the apparatus side shutter 109 move and, thus, open the discharge port 102*a* of the nozzle 102. That is, the pouch 101 of the toner pack 100 communicates with the toner storage portion 36 via the discharge port 102*a*, the receiving port 109*a*, and the apparatus side opening 117*a*. When the pouch 101 is compressed by the user, the toner in the pouch 101 is supplied into the toner storage portion 36 of the developer container 32 together with air via the discharge port 102*a*, the receiving port 109*a*, and the apparatus side opening 117*a*. As described above, toner can be supplied from the toner pack composed of the pouch 101 that is flexible by the user who deforms the pouch 101.

When supply of toner from the toner pack 100 to the developer container 32 is completed, the user rotates the control lever 108 from the open position to the closed position. When the control lever 108 is rotated from the open position to the closed position, the drive transmission portion 108*a* of the control lever 108 presses against the surface 103*b*2 of the pack side shutter 103. As a result, the pack side shutter 103 is rotated from the open position to the shielding position together with the control lever 108. In addition, the surface 103*b*1 of the pack side shutter 103, which is rotated from the open position to the shielding position, presses against the driven transmission portion 109*e* of the apparatus side shutter 109. As a result, the apparatus side shutter 109 is rotated from the open position to the shielding position together with the pack side shutter 103. Then, the user pulls the toner pack 100 out of the mounting unit 106 to complete the toner supply operation.

Second Embodiment

Subsequently, the second embodiment of the present disclosure is described below with reference to FIGS. 23A and 23B. According to the first embodiment, the configuration is described in which the mounted unit 700 of the toner pack 100 is covered by the film 120. Unlike the first embodiment, a configuration according to the second embodiment includes a partial cap 220 that covers the mounted unit 700 and a film 120 that covers at least part of the cap 220. In the following description, parts similar to those described in the first embodiment are identified by the same reference numerals, and detailed description of the parts is omitted.

Figure 23A:
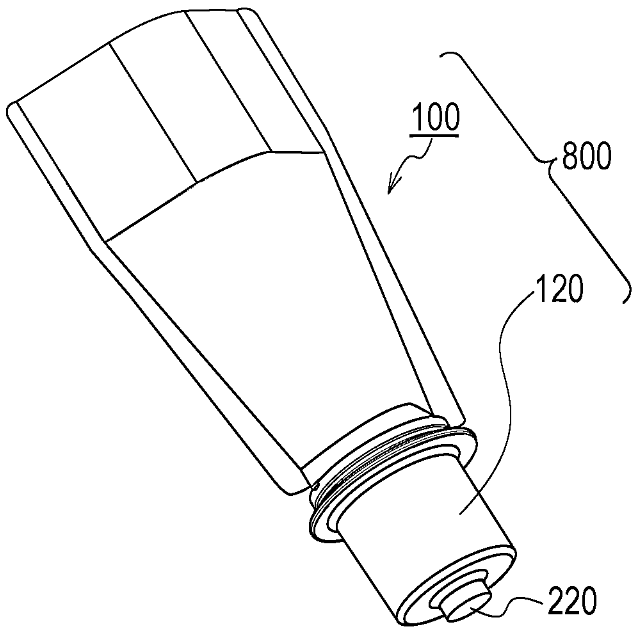
FIG. 23A is a perspective view of a toner pack with a cap that covers the mounted unit and a film that covers the cap.
Figure 23B:
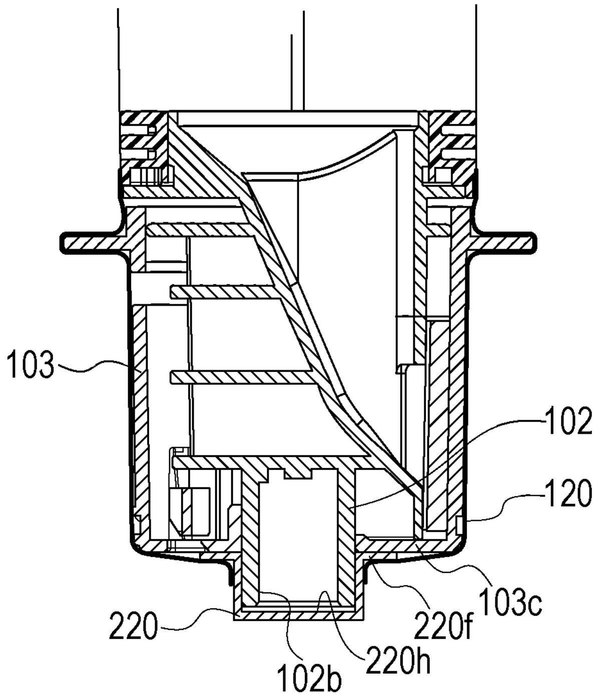
FIG. 23B is a cross-sectional view of the toner pack.

FIG. 23A is a perspective view of an exterior appearance of a toner pack 100, and FIG. 23B is a cross-sectional view of the toner pack 100. As illustrated in FIG. 23A, a container 800 includes the toner pack 100, a film 120 serving as a first protective member, and a cap 220 serving as a second protective member. The outer diameter of the cap 220 is less than the outer diameter of an end surface 103*c* of a pack side shutter 103. As illustrated in FIG. 23B, the cap 220 is provided to cover a protruding portion 102*b* of a nozzle 102. The cap 220 has a recess 220*h* that cover the protruding portion 102*b* of the nozzle 102 and a flange 220*f*. The flange 220*f* of the cap 220 is disposed so as to be sandwiched by the film 120 and the end surface 103*c* of the pack side shutter 103. Thus, the cap 220 is fixed.

As illustrated in FIGS. 19A and 19B, the protruding portion 102*b* of the nozzle 102 is a functional portion that determines the position of the toner pack 100 mounted to the mounting unit 106 relative to the apparatus side shutter 109 in the radial direction r and in the mounting direction M. That is, the cap 220 is provided as only a portion that is a functional portion, and the other portion is covered by the cap 220. Thus, the effect described in the first embodiment can be obtained while more strongly protecting the functional portion. The functional portion is not limited to the protruding portion 102*b*. The functional portion can be selected as appropriate.

While the above embodiments have been described with reference to the pack side shutter 103 and the apparatus side shutter 109 configured to be rotatable about the rotational axes A and B, respectively, between the shielding position and the open position. However, the configuration is not limited thereto. For example, the pack side shutter 103 and the apparatus side shutter 109 may be configured to be movable between the shielding position and the open position by translatory movement parallel to the mounting direction M.

While the above embodiments have been described with reference to the pack side shutter 103 configured to open the discharge port 102*a* of the nozzle 102 only in the open position, the configuration is not limited thereto. For example, the pack side shutter 103 may be a rotating member that opens the discharge port 102*a* of the nozzle 102 regardless of the rotational position. In this case, the discharge port 102*a* of the nozzle 102 may be configured to be closed by a seal when the toner pack 100 is not mounted to the mounting unit 106, and the seal may be removed by the operation of mounting the toner pack 100 to the mounting unit 106 or after the toner pack 100 is mounted. Alternatively, a configuration not including the pack side shutter 103 of the toner pack 100 may be employed.

The outer side of the pouch that can ensure the toner sealability and shape stability may be further covered with a fabric or another material to form the container portion.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-107826 filed Jun. 30, 2023, which is hereby incorporated by reference herein in its entirety.

What is claimed is:

1. A toner container comprising:

a storage portion including a pouch configured to store toner;

a front end portion including (i) a nozzle provided with a discharge port configured to discharge the toner stored in the storage portion to an outside of the toner container and a passage configured to enable the toner to pass through the passage toward the discharge port; and (ii) a shielding member movable between a shielding position in which the shielding member shields the discharge port of the nozzle and an open position in which the shielding member opens the discharge port of the nozzle; and a film covering at least part of the front end portion in a state that the shielding member is in the shielding position, wherein the shielding member includes a cylindrical portion having an outer surface extending in a first direction in which the storage portion and the nozzle are aligned, and an end surface that is provided on a side of a tip end of the cylindrical portion opposite the storage portion in the first direction and that is perpendicular to the first direction, and a flange portion having a flange surface facing the storage portion in the first direction, the flange portion extending outward beyond the outer surface of the cylindrical portion in a second direction perpendicular to the first direction and provided closer to the storage portion than the end surface in the first direction, wherein the film covers the front end portion from the flange surface of the flange portion to the end surface of the cylindrical portion in the first direction.

2. The toner container according to claim 1, wherein the film is configured to have a cylindrical shape in which a first end in the first direction and a second end opposite the first end are open.

3. The toner container according to claim 1, wherein the film covers a joint portion in which the nozzle is joined to the storage portion.

4. The toner container according to claim 1, wherein the storage portion further includes a joint member that is annular and is fixed along an opening portion of the pouch, wherein the pouch is formed from a sheet for storing toner, and wherein the nozzle is configured to be joined to the joint member.

5. The toner container according to claim 1, further comprising:

a cap configured to cover at least part of the front end portion, wherein the cap is removably attached to the front end portion.

6. The toner container according to claim 5, wherein the film covers at least part of the front end portion and at least part of the cap.

7. The toner container according to claim 1, wherein at least part of the film is a breakable portion where the film is breakable.

8. The toner container according to claim 7, wherein the breakable portion is a perforated line.

9. The toner container according to claim 7, wherein the film is configured to have a cylindrical shape with a first end in the first direction open and a second end opposite the first end open, and wherein the breakable portion extends from the first end toward the second end.

10. The toner container according to claim 9, wherein the film includes at least two of the breakable portions that do not intersect.

11. The toner container according to claim 7, wherein the storage portion is a pouch formed from a sheet for storing toner, wherein one of the outer side surfaces of the storage portion has written information, and wherein the breakable portion is disposed in a surface of the film on a side with the written information as viewed from the first direction.

12. The toner container according to claim 7, wherein the film is composed of a stretch film that is stretchable.

13. The toner container according to claim 12, wherein one of the outer side surfaces of the storage portion has written information, and wherein an end of the film is disposed on a surface of the film on a side with the written information as viewed from the first direction.

14. The toner container according to claim 1, wherein the film is composed of a film that shrinks by heat.

15. The toner container according to claim 1, wherein the film is a sheet member having a thickness greater than or equal to 0.01 mm and less than or equal to 0.30 mm.

* * * * *